(12) United States Patent
Nebrigic et al.

(10) Patent No.: US 6,646,415 B1
(45) Date of Patent: Nov. 11, 2003

(54) DYNAMICALLY-SWITCHED POWER CONVERTER

(75) Inventors: Dragan Danilo Nebrigic, Indian Springs, OH (US); Vladimir Gartstein, Cincinnati, OH (US)

(73) Assignee: The Board of Trustees of the University of Illinois, Chicago, IL (US)

( * ) Notice: Subject to any disclaimer, the term of this patent is extended or adjusted under 35 U.S.C. 154(b) by 0 days.

(21) Appl. No.: 10/009,872

(22) PCT Filed: Jun. 23, 2000

(86) PCT No.: PCT/US00/17272
§ 371 (c)(1),
(2), (4) Date: Apr. 12, 2002

(87) PCT Pub. No.: WO01/01553
PCT Pub. Date: Jan. 4, 2001

Related U.S. Application Data
(60) Provisional application No. 60/141,119, filed on Jun. 25, 1999.

(51) Int. Cl.[7] .................................................. H02J 7/00
(52) U.S. Cl. ........................ 320/107; 320/166; 363/49
(58) Field of Search ................................ 320/104, 107, 320/108, 148, 157, 166, 167; 363/49, 59, 60

(56) References Cited

U.S. PATENT DOCUMENTS

| | | | | |
|---|---|---|---|---|
| 4,617,652 A | * | 10/1986 | Simko ................. | 365/185.02 |
| 5,622,789 A | * | 4/1997 | Young ................. | 320/152 |
| 5,773,955 A | * | 6/1998 | Hall ................... | 320/104 |
| 6,304,467 B1 | * | 10/2001 | Nebrigic .............. | 363/49 |
| 6,412,207 B1 | * | 7/2002 | Crye et al. ........... | 42/70.06 |

FOREIGN PATENT DOCUMENTS

| DE | 296 05 699 U1 | 3/1996 |
|---|---|---|
| EP | 0 653 798 A1 | 10/1994 |

* cited by examiner

Primary Examiner—Pia Tibbits
(74) Attorney, Agent, or Firm—Welsh & Katz, Ltd.

(57) ABSTRACT

A DC/DC power converter is efficiently switched to produce a predetermined output voltage across a load capacitor as required by a load device. In particular, a capacitive and/or inductive element is switched between a charge and discharge state as required to maintain the output voltage. For a capacitive-only power converter, or charge pump, comparison of the output voltage to a reference voltage efficiently switches a fly capacitor between charging and discharging states. Also, power converter based on switching of an inductive element with a synchronous rectifier and switch to charge the load capacitor is made more efficient by a hysteretic comparison of the output voltage to predetermined thresholds for stopping the Pulse Width Modulation (PWM) modulation when the predetermined output voltage is achieved. The power converters illustrated are suitable for integrated circuit implementation and may be combined with other elements of a battery to produce a more efficient battery, achieving longer service life and output voltage stability.

9 Claims, 16 Drawing Sheets

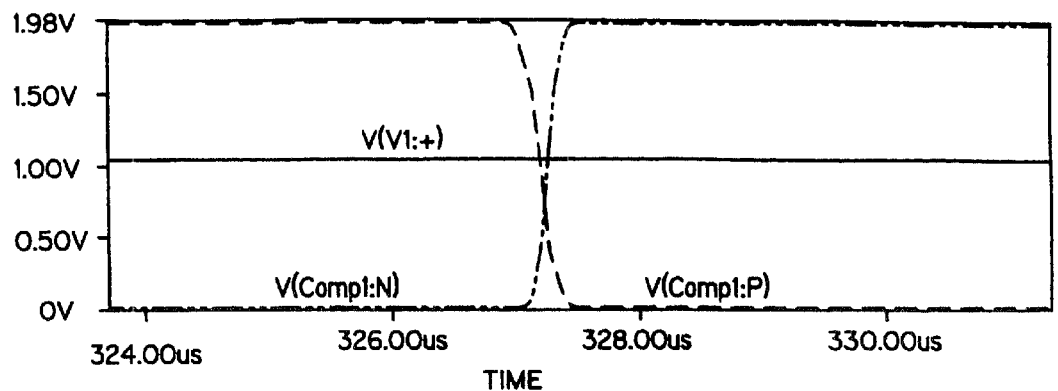
FIG. 15B
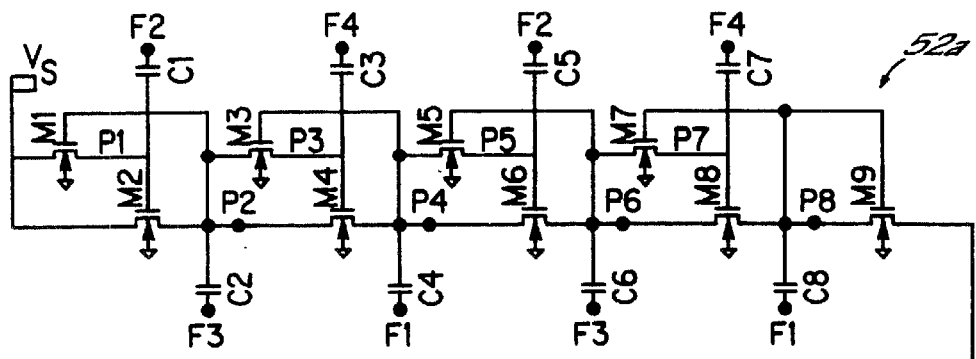
FIG. 16
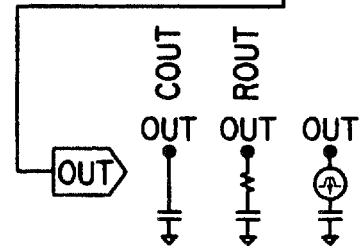
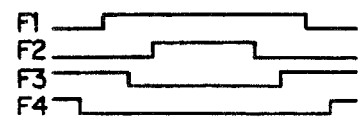
FIG. 16A  FIG. 17A

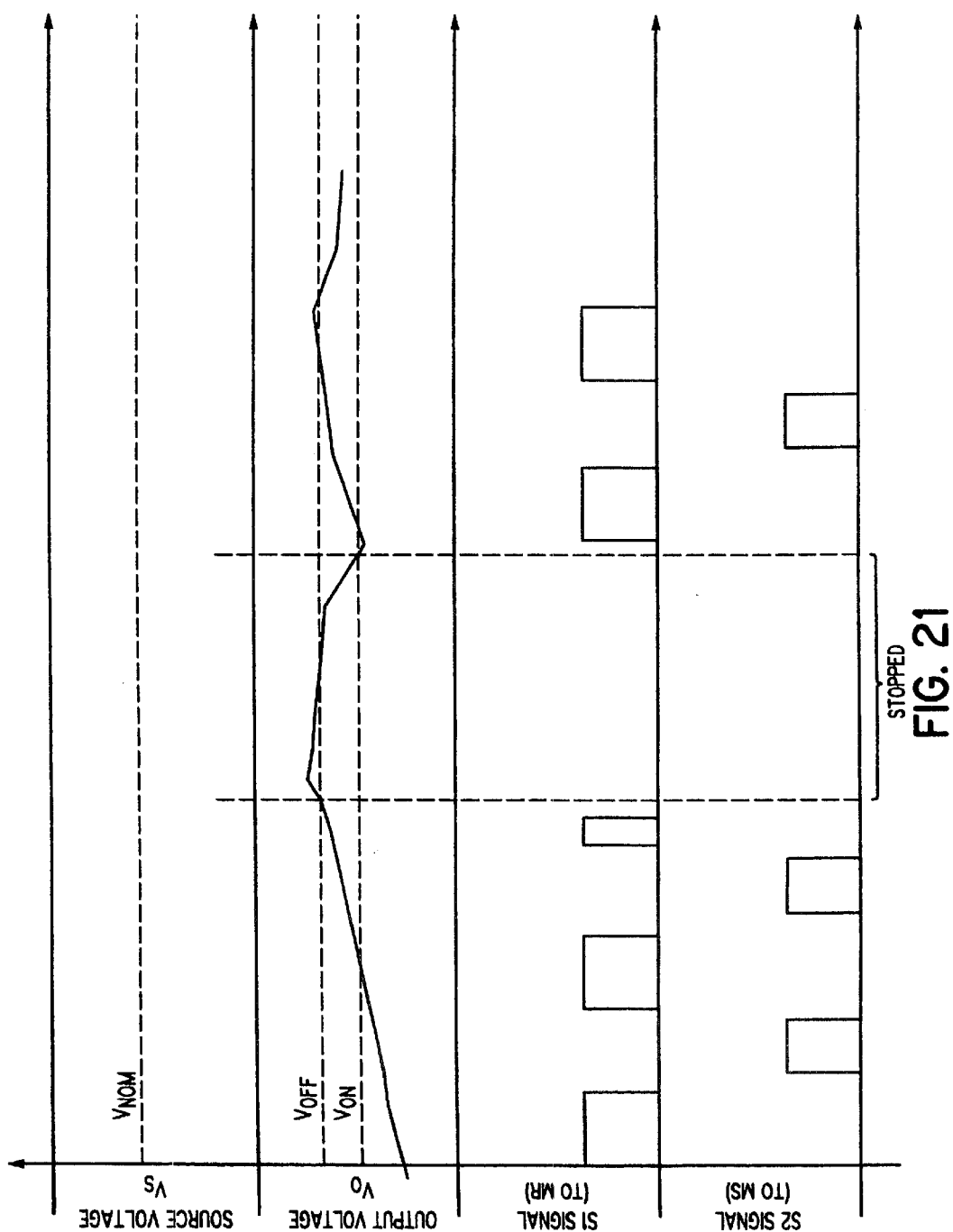

DYNAMICALLY-SWITCHED POWER CONVERTER

This application claims the benefit of Provisional Application No. 60/141119, filed Jun. 25, 1999.

FIELD OF THE INVENTION

The present invention relates to DC/DC power supply controllers, and more particularly to regulated capacitive-only or capacitive/inductive power converters for integrated power management systems.

BACKGROUND OF THE INVENTION

Advances in electronics technology have enabled the design and cost-effective fabrication of portable electronic devices. Thus, usage of portable electronic devices continues to increase as do the number and types of products. Examples of the broad spectrum of portable electronic devices include pagers, cellular telephones, music players, calculators, laptop computers, and personal digital assistants, as well as others.

The electronics in a portable electronic device generally require direct current (DC) electrical power. Typically, one or more batteries are used as an energy source to provide this DC electrical power. Ideally, the energy source, such as consumer batteries of standard sizes such as AAA, AA, A, C, D and prismatic 9V, would be perfectly matched to the energy requirements of the portable electronic device. Improvements in electrochemical formulations, such as alkaline and lithium electrochemical cells, have satisfied to a limited degree needs for batteries having increased shelf life, increased stored charge, and peak capacity. With even these changes, a number of deficiencies exist.

For instance, many portable devices include integrated circuits having a minimum voltage level in order to operate. Voltaic cells such as electrochemical cells have an output voltage level that generally declines over the service life of the battery. Generally, a significant portion of the battery service life occurs after the output voltage of the battery has declined below the minimum voltage level of the device. In some instances, the wasted service life is as much as 80%.

In addition, most often the voltage and current from the batteries are unsuitable for directly powering the electronics of the portable electronic device. For example, the voltage level determined from the batteries may differ from the voltage level required by the device electronically. In addition, some portions of the electronics may operate at a different voltage level than other portions, thereby requiring different energy source voltage levels. Still further, batteries are often unable to respond quickly to rapid fluctuations in current demand by a device.

A typical arrangement is shown in FIG. 1 for a portable electronic device 10 that includes an energy source 12, such as one or more batteries, and a load device 14, such as the internal electronics that require electrical power. Interposed between the energy source 12 and the load device 14 is a power supply 16 that may perform a number of functions. For example, a power converter 20, depicted as integral to the power supply 16, provides the necessary changes to the power from the energy source 12 to make it suitable for the load device 14.

With respect to the types of power conversion required, the power converter 20 may "step up" (i.e., boost) or "step down" the voltage. That is, the converter 20 may increase or decrease an input voltage $V_S$ from the energy source 12 across a pair of input terminals 24, 25 to an output voltage $V_O$ provided to the load device 14 across a pair of output terminals 26, 27. The power converter 20 may also store an amount of energy to satisfy a brief spike or increase in demand by the load device 14 that the energy source 12 is unable to provide.

The power converter 20 may also regulate the output voltage $V_O$, keeping it close to the desired output voltage level and reducing rapid fluctuations that may cause detrimental noise or cause undesirable performance of the load device 14. Such fluctuations may occur due to changes in demand by the load, induced noise from external electromagnetic sources, characteristics of the energy source 12, and/or noise from other components in the power supply 16.

Conventionally, switching power converters 20 are used in portable devices due to their suitable size and cost. However, capacitive-only charge pump or inductive/capacitive switching power converters 20 typically rely upon oscillatory switching between a charge and discharge state to transfer power from an energy source such as an electrochemical voltaic cell 12 to a load device 14. Each switching of state incurs a significant consumption of power that reduces the shelf-life of the voltaic cell.

In addition, although generally suitable for being portable, such power converters 20 still adversely impact the size, weight and cost of the portable device.

Moreover, the power converters typically cannot be optimized for a wide array of available types of electrochemical voltaic cells 12 (e.g., lithium, alkaline). Consequently, such power converters 20 generally only regulated voltage at a consider loss of efficiency or boost the voltage derived from the cell 12 in an unregulated fashion.

Consequently, a significant need exists for a power converter that more efficiently provides an efficient, regulated output voltage for portable electronic devices.

SUMMARY OF THE INVENTION

The invention overcomes the above-noted and other deficiencies of the prior art by providing an apparatus and method for a dynamically controlled inductive DC/DC power converter that efficiently transfers power from an energy source as demanded by a load device.

The present invention meets these and other needs by providing a battery with a built-in, dynamically-switched capacitive device. More particularly, a power converter is provided to adjust an output voltage ($V_O$) across a positive and negative terminal of the battery dynamically based on the electrical load using an efficient switching approach, with both the power converter and switching approach optimized for incorporation within a battery container. Furthermore, the power converter would be adaptable to a number of battery types.

In some of our previous inventions, introduction of electronic circuitry within the container of a battery, especially standard-sized consumer batteries, was shown to provide a number of advantages such as by regulating the output voltage. Specifically, the following co-pending and commonly owned applications were all filed on Apr. 2, 1998: U.S. Ser. No. 09/054,192, entitled PRIMARY BATTERY HAVING A BUILT-IN CONTROLLER TO EXTEND BATTERY RUN TIME, naming Vladimir Gartstein and Dragan D. Nebrigic; U.S. Ser. No. 09/054,191, entitled BATTERY HAVING A BUILT-IN CONTROLLER TO EXTEND BATTERY SERVICE RUN TIME naming Vladimir Gartstein and Dragan D. Nebrigic; U.S. Ser. No. 09/054,087, ENTITLED BATTERY HAVING A BUILT-IN CONTROLLER, naming Vladimir Gartstein and Dragan D. Nebrigic; and U.S. Provisional Application Serial No. 60/080,427, entitled BATTERY HAVING A BUILT-IN CONTROLLER TO EXTEND BATTERY SERVICE RUN TIME, naming Dragan D. Nebrigic and Vladimir Gartstein. All of the aforementioned applications are hereby incorporated by reference in their entirety.

In another of our inventions, we showed the advantage of incorporating electronic circuitry for additional advantages such as providing enhanced indications of the state of charge of the battery. Specifically, the co-pending and commonly owned application filed on Apr. 23, 1999: U.S. Ser. No. 09/298,804, entitled BATTERY HAVING A BUILT-IN INDICATOR, naming Dragan D. Nebrigic and Vladimir Gartstein, wherein the aforementioned application is hereby incorporated by reference in its entirety. Also discussed was an inductive-capacitive power converter that advantageously increased the battery output voltage.

We have since discovered that a capacitance-only power converter based upon a charge pump had a number of desirable attributes for applications requiring the increase in battery output voltage, especially for the versions described below which provide for size and power requirements of a battery.

Furthermore, in an illustrative version, the power converter utilizes a load capacitor that receives a transfer of charge from a fly capacitor. More particularly, the fly capacitor is switched dynamically to accommodate varying loads on the load capacitor to efficiently transfer charge. Specifically, the power converter comprises a charge pump including a switching matrix controlling a fly capacitor wherein the fly capacitor is switched to charge mode electrically parallel to a voltaic cell of the battery. Thereafter, the switching matrix switches to a discharge mode where the potential of the fly capacitor is additively placed in series with the voltaic cell, and the combination is electrically coupled across the load capacitor to discharge the stored charge in the fly capacitor into the load capacitor.

As a further aspect, in order to increase the current output capacity of the load capacitor, the switching of the fly capacitor is dynamically performed by a switching matrix controller, rather than merely oscillating the state of the switching matrix without regard to electrical load. Dynamic control allows for power conservation during periods of low power demand on the battery.

Another aspect is to dynamically control the switching matrix by incorporating a comparator into the switching matrix controller. In some versions, also provided is a voltage reference and temperature compensation for the voltage reference for the comparator to use in comparing the output voltage to a predetermined threshold.

In an additional aspect, an internal power supply is provided to bias the power converter, especially for voltaic cells having a relatively low nominal voltage.

In order to achieve low power consumption and to operate within the small volume typical of some batteries, the power converter is largely fabricated as an Application Specific Integrated Circuit (ASIC). Moreover, Field Effect Transistors (FET) are described that have the capacity for the peak battery current yet provide a low power consumption.

More particularly, we have found that dynamically controlling a power converter as required by the load on a battery provides additional peak capacity and/or increased power efficiency, among other advantages. In addition, such a dynamic switching lends itself to a wide range of voltaic cells (e.g., electrochemical cells such as lithium, zinc acid, alkaline, etc.; electro mechanical cells, solar cells; etc.).

Consistent with yet a further aspect of the invention, dynamic control of a inductive-capacitive DC/DC power converter includes sensing an adequate state of charge of a load capacitor across the output terminals and stopping pulse width modulation control of the switching of an inductive element, a synchronous rectifier and a switch to reduce power consumption by the power converter.

These and other advantages of the present invention will become apparent in the discussion below.

BRIEF DESCRIPTIONS OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

FIG. 16 is an electrical circuit for a single-stage boost chain internal power supply for the Application Specific Integrated Circuit (ASIC) of FIG. 3 with FIG. 16A depicting a clocking signal to properly sequence the circuit.

FIG. 21 is a timing diagram for the start-stop controller of FIG. 20.

DETAILED DESCRIPTION OF THE INVENTION

Dynamic Control of a Power Converter

Figure 1:
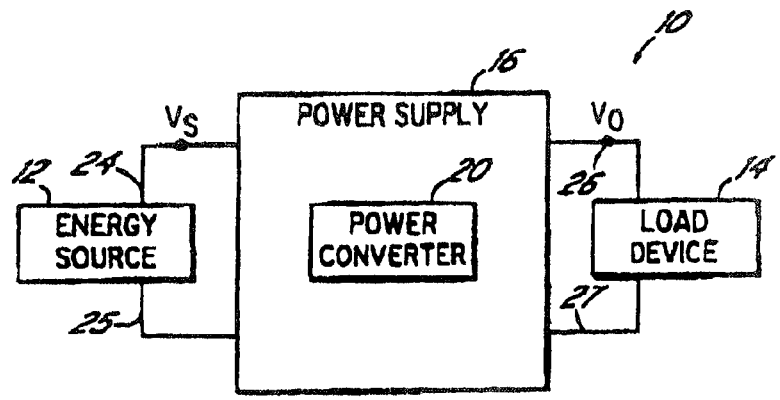
FIG. 1 is a top-level block diagram of a portable electronic device incorporating a power supply with a power converter.
Figure 2:
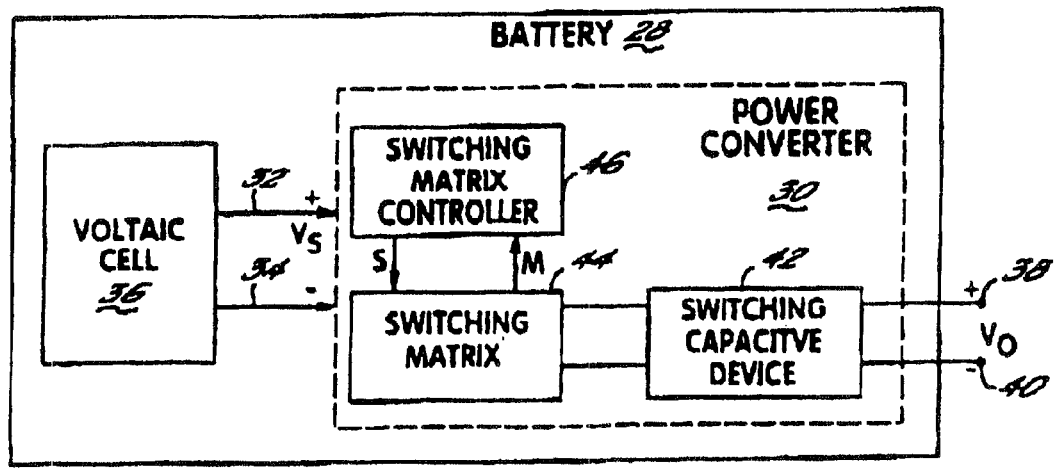
FIG. 2 is an electrical block diagram of a battery interposing a power converter between a voltaic cell and terminals of the battery.

Referring to FIG. 2, an electrical block diagram of a battery 28 includes a power converter 30 interposed between input terminals 32, 34 of a voltaic cell 36 and a positive output terminal 38 and negative output terminal 40 of the battery 28. The power converter 30 comprises a switched capacitive device 42 across a positive and negative output terminals 38, 40 whose mode is switched by a switching matrix 44. The switching matrix 44 is controlled by a signal S from a switching matrix controller 46 that generates the signal S in response to a measurement M received from the switching matrix 44.

Figure 3:
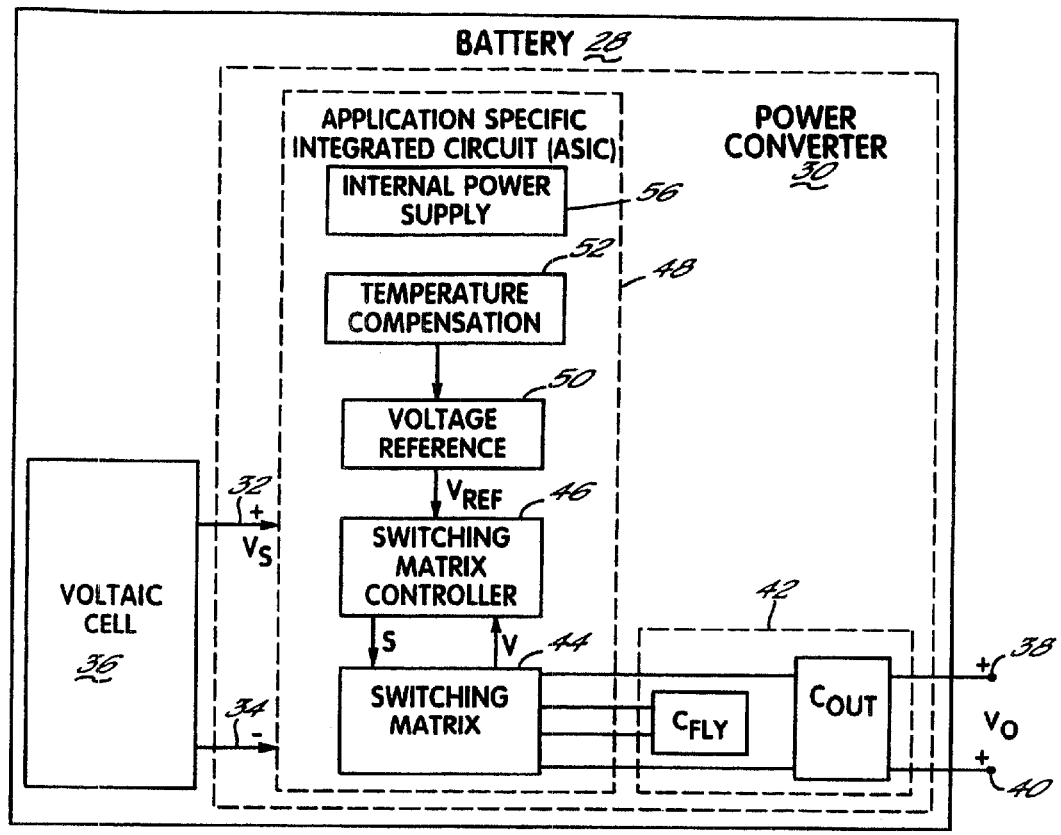
FIG. 3 is an electrical block diagram of a battery including a power converter comprised of an Application Specific Integrated Circuit (ASIC) and an output capacitor and a fly capacitor.

FIG. 3 is an electrical block diagram of a battery 28 of FIG. 2 showing additional aspects of the invention. For example, the power converter 30 may utilize a switched capacitive device 42 in the form of an output capacitor $C_{OUT}$ across the terminals 38, 40 and a fly capacitor $C_{FLY}$. The output capacitor $C_{OUT}$ and the fly capacitor $C_{FLY}$ are also electrically coupled across respective portions of the switching matrix 44. A portion of the power converter 30 may include an Application Specific Integrated Circuit (ASIC) 48 incorporating the switching matrix 44 and switching matrix controller 46. For some applications utilizing voltaic cells 14 having a relatively low nominal source voltage $V_S$, the ASIC 48 may further include a voltage reference 50, preferably extremely low power consuming with good stability, providing a reference voltage ($V_{REF}$) signal to the switching matrix controller 46. Since some voltage references 50 may vary as a function of semiconductor temperature, temperature compensation 52 to the voltage reference 50 may also be included, such as a proportional-to-absolute-temperature circuit. Voltaic cells 14 such as lithium electrochemical cells have an inherent bandgap voltage reference that may utilized. As will be shown in more detail below, the ASIC 48 may further include an internal power supply 56 which allows efficient operation of other portions of the ASIC 48 at relatively low voltage levels of the source voltage $V_S$.

Capacitive-only Power Converter (Charge Pump)

Figure 4:
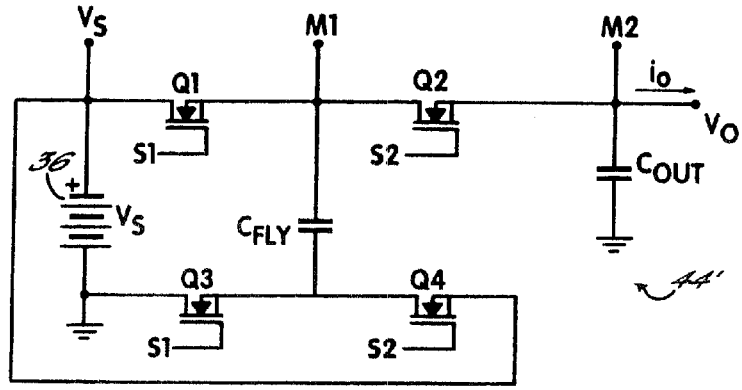
FIG. 4 is an electrical circuit for a noninverting switching matrix, fly capacitor, and output capacitor of FIG. 3.

FIG. 4 is an electrical circuit for a noninverting switching matrix 44', fly capacitor $C_{FLY}$, and output capacitor $C_{OUT}$ of FIG. 3, and depicts a simplified voltage doubler. During the first half-cycle during a charge mode, switch signal S1 commands switch Q1 and switch Q3 closed, switch signal S2 commands switch Q2 and switch Q4 closed, and capacitor $C_{FLY}$ charges to $V_s$. During the second half cycle, switch signal S1 commands switch Q1 and switch Q3 open, and switch signal S2 commands switch Q2 and switch Q4 closed, and $C_{FLY}$ is level shifted upward by $V_S$ volts. This connects the fly capacitor $C_{FLY}$ to the output capacitor $C_{OUT}$, allowing energy to be delivered to the output as necessary. The actual voltage is slightly lower than $2 \times V_S$, since switches Q1–Q4 have resistance that drains charge from $C_{OUT}$.

The power efficiency of a switched capacitive device 42 is affected by three factors: the internal losses in the ASIC 48, the resistive losses of the capacitors $C_{FLY}$, $C_{OUT}$, and the conversion losses during charge transfer between the capacitors $C_{FLY}$, $C_{OUT}$.

The total power loss is:

$$P_{LOSS} = P_{LOSS\ INTERNAL\ LOSSES} + P_{PUMP\ CAPACITOR\ LOSSES} + P_{CONVERSION\ LOSSES}$$

where (1) the internal losses are associated with the IC's internal functions, such as driving the switches, etc. (These losses are affected by operating conditions such as input voltage, temperature, and frequency); (2) the switch losses occur because of the on-resistance of the MOSFET (Metal Oxide Semiconductor Field Effect Transistor) switches in the IC; and (3) the charge-pump capacitor losses occur because of the Equivalent Series Resistance (ESR) of the fly capacitor and load capacitor.

The relationship between these losses and the output resistance is as follows:

$$P_{PUMP\ CAPACITOR\ LOSSES} + P_{SWITCH\ LOSSES} = i_O^2 \times R_{OUT}$$

$$R_{OUT} \cong (1/(f_{OSC} \times C_{FLY})) + 2R_{SWITCHES} + 4ESR_{CFLY} + ESR_{COUT}$$

where $f_{OSC}$ is the oscillator frequency. The first term $R_{OUT}$ is the effective resistance from an ideal switched-capacitor power converter 30.

As the output current $i_O$ increases, the output voltage $V_O$ of the battery 28 droops. The voltage droop $V_{DROOP}$ equals the output current $i_O$ drawn from the battery 28 times the output resistance of the battery $R_{OUT}$, as follows:

$$V_{DROOP} = i_O \times R_{OUT}$$

$$V_O = 2 \times V_S - V_{DROOP}$$

Conversion losses occur during the charge transfer between the fly capacitor $C_{FLY}$ and the load capacitor $C_{OUT}$ when there is a voltage difference between them. The power loss is:

$$P_{CONVERSION} = [(C_{FLY}/2) \times (4V_{2S} - V2O) + (C_{OUT}/2) \times (2V_O \times V_{RIPPLE} - V^2_{RIPPLE})] \times f_{OSC},$$

where $V_{RIPPLE}$ is the peak-to-peak output voltage ripple determined by the output capacitor $C_{OUT}$ and load current $i_O$.

To maintain the lowest output resistance $R_{OUT}$ one should use capacitors $C_{FLY}$, $C_{OUT}$ with low ESR. The charge pump output resistance $R_{OUT}$ is a function of the ESR of the fly capacitor $C_{FLY}$ and load capacitor $C_{OUT}$ and the internal switch resistance, as shown in the equation below. Minimizing the ESR of the load capacitor $C_{OUT}$ minimizes the total resistance $R_{OUT}$. Using a larger flying capacitor $C_{FLY}$ reduces the output impedance and improves efficiency. Above a certain point, increasing the capacitance of the fly capacitor $C_{FLY}$ has a negligible effect because the output resistance $R_{OUT}$ becomes dominated by the resistance and capacitance of the internal switches. But when space is a constraint as in most batteries, it may be necessary to trade-off an achievable lower output resistance ROUT for the sake of small capacitor size.

A capacitance value for the fly capacitor $C_{FLY}$ of about 10 uF or more is sufficient to supply the specified load current. Surface-mount ceramic capacitors within this capacitance range are suitable for a number of application for the fly capacitor $C_{FLY}$, due to their small size, low cost, and low equivalent series resistance (ESR). To ensure proper operation over the entire temperature range, ceramic capacitors with X7R (or equivalent) low-temperature-coefficient dielectrics may be used advantageously.

Increasing the output capacitance value of the output capacitor $C_{OUT}$ reduces the output ripple voltage $V_{RIPPLE}$. Decreasing its ESR reduces both output resistance $R_{OUT}$ and ripple $V_{RIPPLE}$, Increasing the capacitance of the output capacitor $C_{OUT}$ reduces the output ripple voltage. Decreasing its ESR reduces both output resistance and ripple. Smaller capacitance values can be used with light loads. The following equation to calculate the peak-to-peak ripple:

$$V_{RIPPLE} = i_O/(f_{OSC} \times C_{OUT}) + 2 \times i_O \times ESR_{COUT}$$

The output capacitor $C_{OUT}$ stores the charge transferred from the flying capacitor $C_{FLY}$ and services the load between charge/discharge cycles. A good general rule is to make the output capacitance $C_{OUT}$ at least ten times greater than that of the flying capacitance.

In a start-stop mode, power converter 30 switches only as needed to keep output voltage at the desired value. Also for light loads and voltages above lower threshold output voltage, the switching matrix 44 is completely turned off. This mode is dominant in the case of a power converter 30 with high efficiency capacitors because the large value of capacitance acts as a secondary battery. In this mode, ripple $V_{RIPPLE}$ depends mostly two parameters: charge transfer between the capacitance values of $C_{FLY}$ and $C_{OUT}$, and the ESR of $C_{OUT}$.

High efficiency capacitors are those types of capacitors having relatively low charge leakage, for example double layer electrolytic capacitors (e.g., capacitors known as super capacitors, ultra capacitors, and power capacitors) and pseudo capacitors.

The ESR ripple contribution occurs as the output capacitor $C_{OUT}$ charges. The charging current creates a negative voltage pulse across the ESR of the output capacitor $C_{OUT}$ that recedes as the output capacitor $C_{OUT}$ charges. At equilibrium, when the voltage on the fly capacitor $C_{FLY}$ approaches that on the output capacitor $C_{OUT}$, no charging current flows. This effect is even more pronounced in the case of a high efficiency capacitor.

The ripple contribution due to charge transfer between capacitors $C_{FLY}$, $C_{OUT}$ creates a pulse as charge flows to the output capacitor $C_{OUT}$. Adding the two terms does not determine peak-to-peak ripple because their peaks do not occur at the same time. It is the best to use the dominant term. The expression for the ripple component due to the ESR of $C_{OUT}$ is:

$$V_{RIPPLE(ESR)} = 8 \times [(V_S - 2V_O^2)/f_{OSC}] \times [ESR_{COUT}/(R_O^2 \times C_{FLY})]$$

The expression for the ripple component predominantly due to charge transfer is:

$$V_{RIPPLE(ESR)} = 2 \times [(V_S - 2V_O^2)/f_{OSC}] \times [1/(R_{OUT} \times (C_{FLY} + C_{OUT}))],$$

where $R_{OUT}$ is open-loop output impedance. If the ESR of the output capacitor $C_{OUT}$ is very small, as is likely when ceramic capacitors are used, $V_{RIPPLE\ (TRANSFER)}$ dominates. If the ESR is relatively large, as with low-cost tantalum capacitors, then $V_{RIPPLE\ (ESR)}$ dominates.

Continuous mode is a constant frequency mode when the charge pump power converter 30 works continuously. The expression for dominant ripple is thus:

$$V_{RIPPLE} = i_O/(f_{OSC} \times C_{OUT}) + 2 \times i_O \times ESR_{COUT}$$

In case of a high efficiency capacitor, the output voltage is quasi-linear so ripple is almost an irrelevant parameter.

In an initial starting mode, switches Q1 and Q2 may be advantageously preset to an "on" state to provide initial charge to the output capacitor $C_{OUT}$ to prevent parasitic latch-up of the ASIC 48, especially for electro voltaic cells having a nominal voltage of about 1.2 V to about 1.5 V. After the switching matrix controller 46 is loaded by an internal power supply (not shown) and after the fly capacitor $C_{FLY}$ is charged, then normal operation is performed.

Figure 4A:
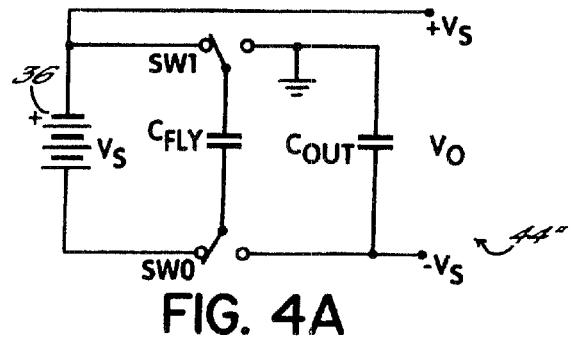
FIG. 4A is an electrical circuit of an inverting switching matrix, fly capacitor, and output capacitor of FIG. 3.

FIG. 4A is an electrical circuit of an inverting switching matrix 44", fly capacitor $C_{FLY}$, and output capacitor $C_{OUT}$ of FIG. 4, illustrating the advantages of dynamic switching of a capacitive power converter 30 to achieve an inverted output. In the latter as shown in FIG. 4A, rather than adjusting upward the positive voltage potential at the positive terminal 38, the negative voltage potential at the negative terminal 40 is lowered, by selectively switching switches SW0 and SW1.

Figure 5:
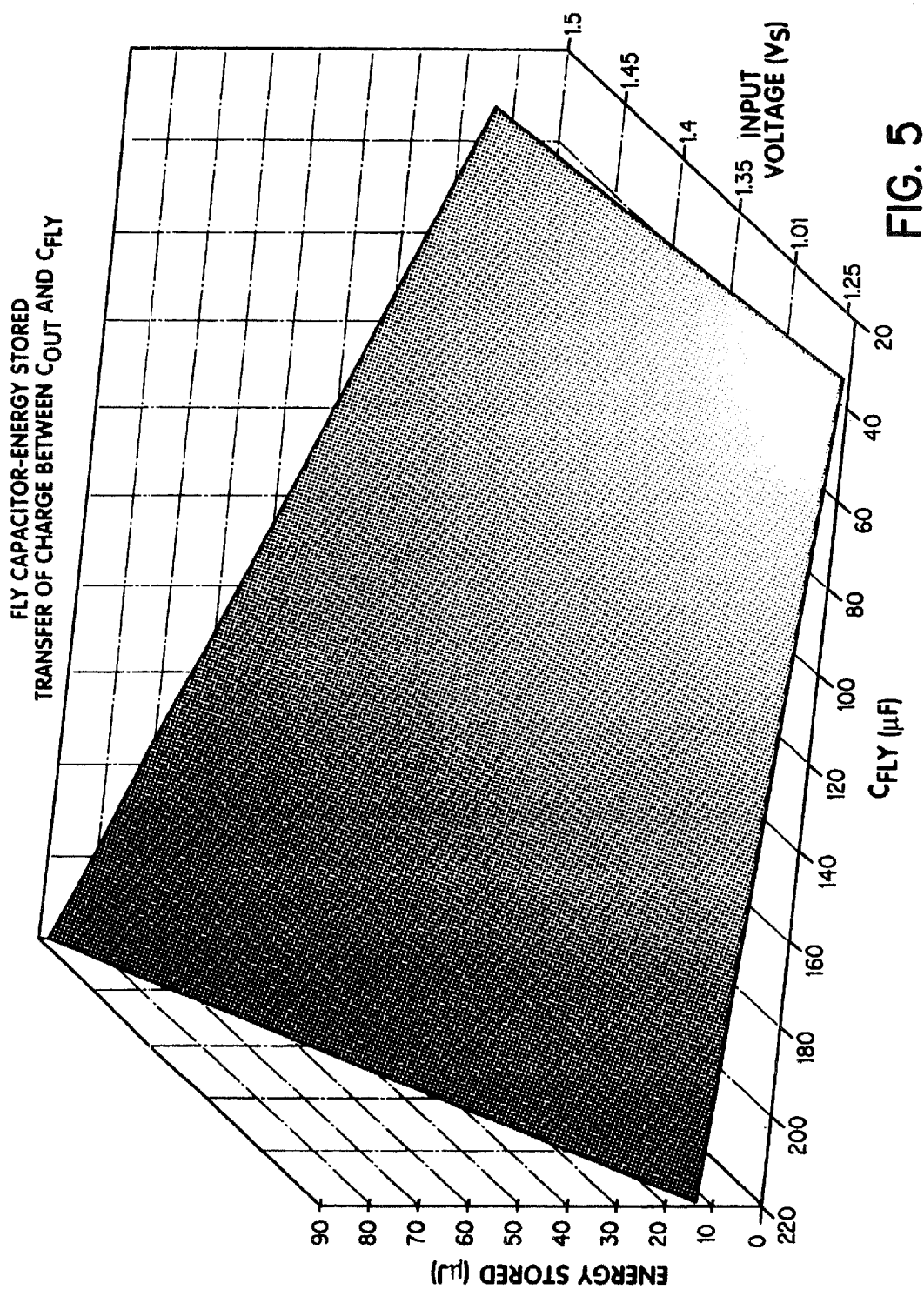
FIG. 5 is a three-dimensional plot of stored charge in the fly capacitor as a function of source voltage ($V_S$) and the capacitance of the fly capacitor ($C_F$).

FIG. 5 is a three-dimensional plot of stored charge in the fly capacitor $C_{FLY}$ as a function of source voltage $V_S$ and the capacitance of the fly capacitor $C_{FLY}$.

Figure 6A:
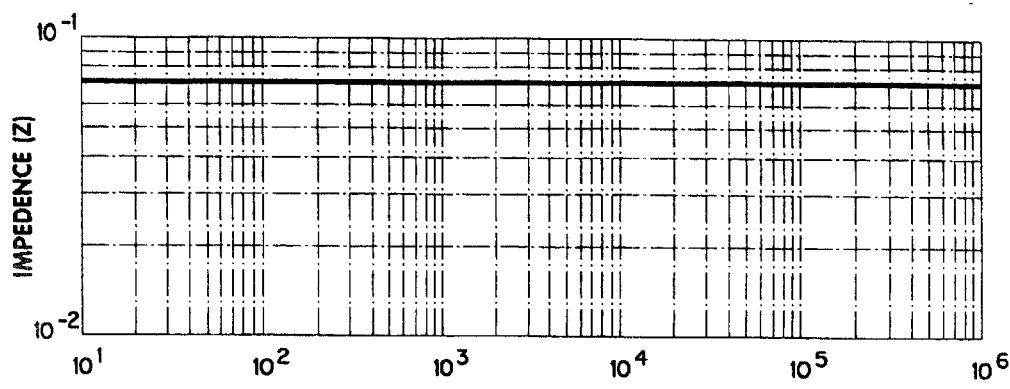
FIGS. 6A and 6B are a representative complex impedance plots as a function of frequency for a high efficiency capacitor, specifically an 8 F ultra-capacitor sold by Maxwell as a model Ultra PC223.
Figure 6B:
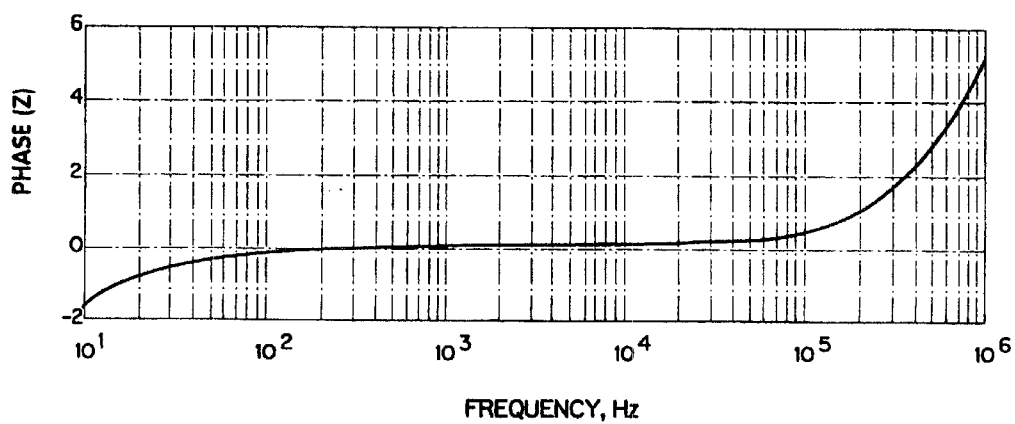

FIGS. 6A and 6B are a representative complex impedance plot as a function of frequency for an ultra-capacitor, specifically an 8 F ultra-capacitor sold by Maxwell as a model Ultra PC223, illustrating its beneficial low impedance.

Figure 7:
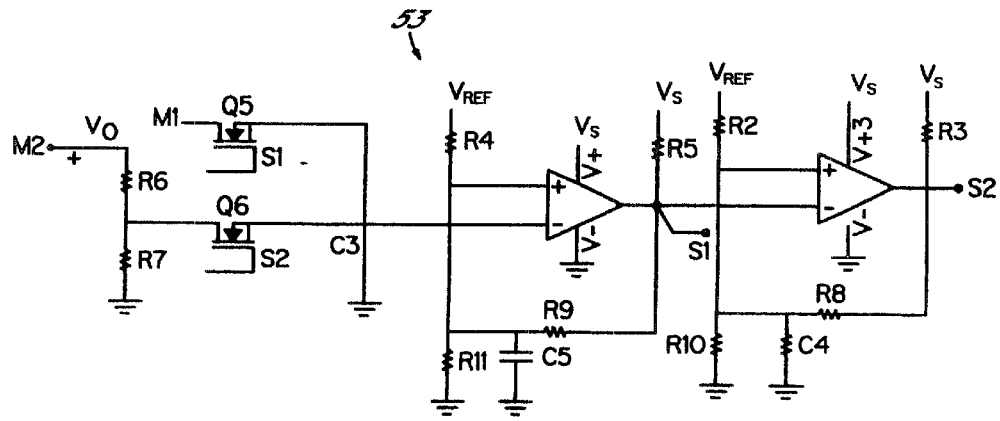
FIG. 7 is an electrical circuit for an illustrative circuit for a first comparator demonstrating an approach for the switching matrix controller of FIG. 4.

FIG. 7 is an electrical circuit for an illustrative circuit for a first comparator 53 demonstrating an approach for the switching matrix controller 46 of FIG. 4.

The capability that such a comparator 53 provides when used to dynamically switch the switching matrix 44 will be shown below. In short, fly capacitor $C_{FLY}$ should advantageously be switched only when needed in a closed-loop approach, and not based on an open-loop oscillator approach. The basic idea is to switch the fly capacitor $C_{FLY}$ into the discharge mode when the output capacitor $C_{OUT}$ reaches a certain predetermined threshold voltage (V1). At this point, the fly capacitor $C_{FLY}$ will charge the output capacitor $C_{OUT}$. When the output capacitor $C_{OUT}$ reaches a certain voltage (V2), the fly capacitor $C_{FLY}$ is switched out, and back to the voltaic cell 36 to be charged. The key here is to only switch based on these voltages.

The comparator 53 utilizes M1/M2 as measure points for the switch. It is important to note that this is an illustrative representation, based on only ideal models. A generic comparator 53 is used to demonstrate the general operations of the dynamic switching matrix controller 46.

Figure 8:
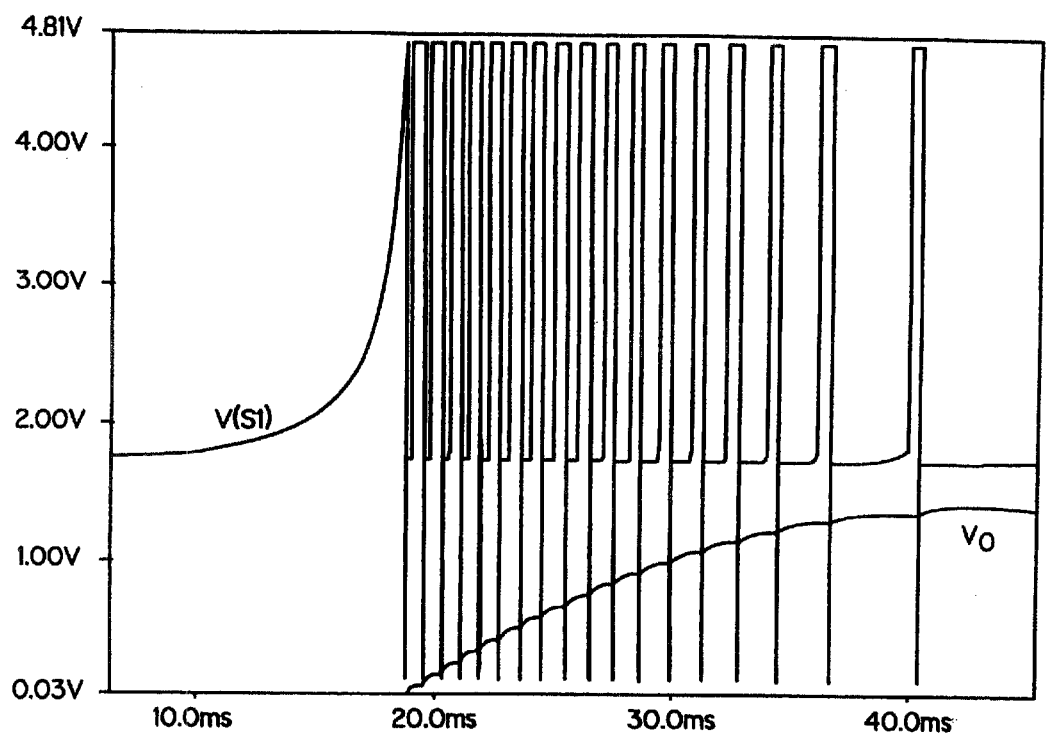
FIG. 8 is a voltage plot, during the time interval required for the output capacitor to charge, of a switch signal to the switching matrix of FIG. 4 generated by the first comparator of FIG. 7 in response the plotted output voltage sensed at the output capacitor.

FIG. 8 is a voltage plot during the time interval required for the output capacitor $C_{OUT}$ to charge. For this simulation, component values were chosen as follows: R2=6 kΩ; R3=1 kΩ; R4=6 kΩ; R5=1 kΩ; R6=100 kΩ; R7=R8=R9=10 kΩ; R10=R11=25 kΩ; C3=10 pF; C4=C5=1 pF. Depicted is a voltage plot of a switch signal S1 to the switching matrix 44 switches Q1 and Q3 of FIG. 4, this signal S1 being generated by the first comparator 53 of FIG. 7. Also plotted is the output voltage $V_O$ sensed at the output capacitor $C_{OUT}$ and returned to the first comparator 53 as measured signal M2. One aspect of the operation of the comparator 53 evident from FIG. 8 is how the switching rate varies depending on the load on the battery 28.

Figure 9:
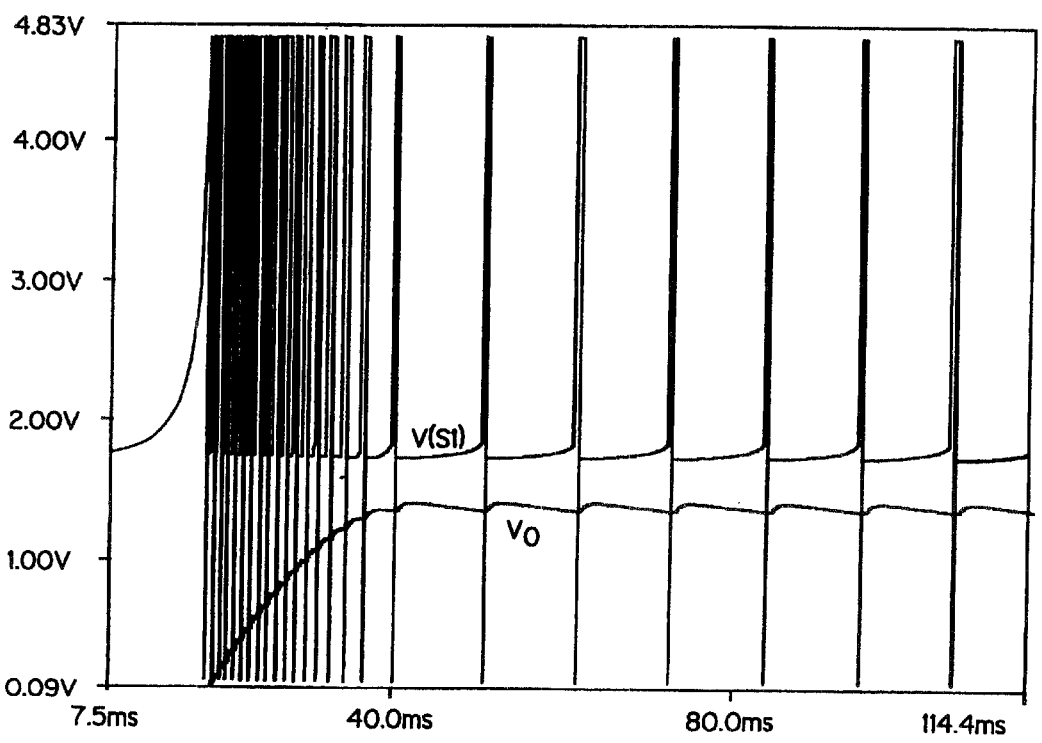
FIG. 9 is the voltage plot of FIG. 8 for a longer period of time to show steady-state operation of the power converter.

FIG. 9 is the voltage plot of FIG. 8 for a longer period of time to show steady-state operation of the power converter 30, reinforcing the dynamic operation of the comparator 53 to the load demand.

Figure 10:
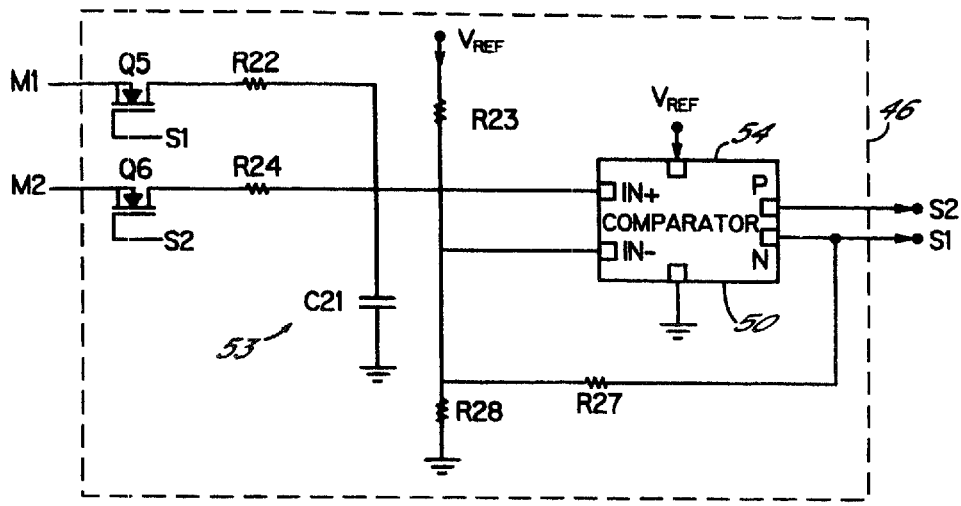
FIG. 10 is an electrical circuit for a switching matrix controller utilizing a comparator biased by a voltage divider for a predetermined threshold.

FIG. 10 is an electrical circuit for a switching matrix controller 46 utilizing a comparator 53 biased by a voltage divider 54 for a predetermined threshold.

Figure 10A:
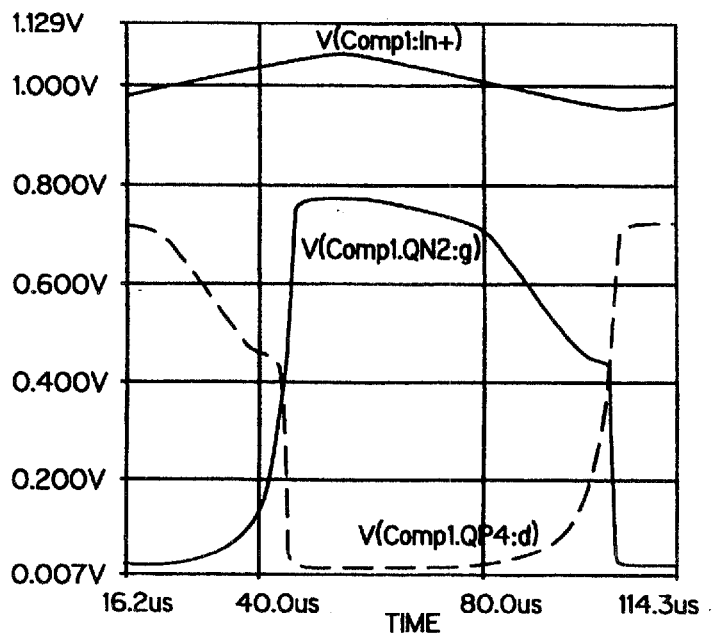
FIG. 10A is a representative voltage plot over time for the switching matrix controller of FIG. 10 showing a desirable hysteresis in switch commands for the switching matrix as the output voltage varies around the predetermined threshold.

FIG. 10A is a representative voltage plot over time for the switching matrix controller 46 of FIG. 10 showing a desirable hysteresis in switch commands for the switching matrix 44 as the output voltage varies around the predetermined threshold. For this simulation, the component values for FIG. 10 were chosen to be as follows: R22=1 MΩ; R23=40 kΩ; R24=10 MΩ; R27=1 MΩ; R28=200 kΩ; C21=22 pF.

Figure 11:
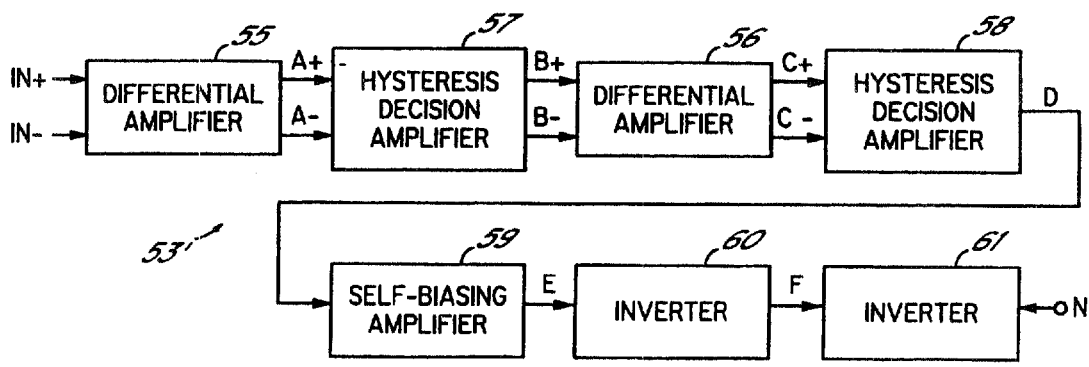
FIG. 11 is an electrical block diagram of a second comparator for the switching matrix controller of FIG. 10.

FIG. 11 is an electrical block diagram of a second comparator 53' for the switching matrix controller 46 of FIG. 10. Specifically, a series arrangement is depicted of a differential amplifier 55, differential amplifier 56, hysteresis decision amplifier 57, hysteresis decision amplifier 58, self-biasing amplifier 59, inverter 60 and inverter 61.

Figure 11A:
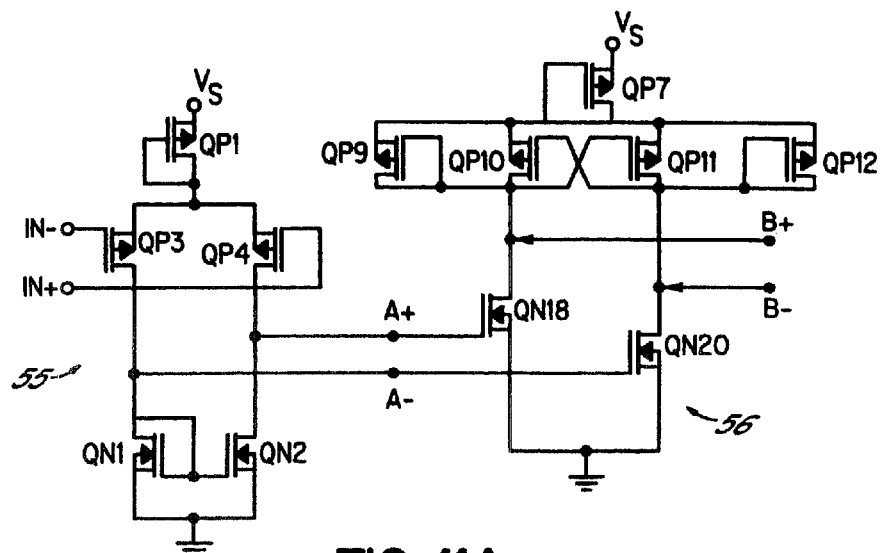
FIG. 11A is a first pair of a differential amplifier followed by a hysteresis decision amplifier for the second comparator of FIG. 11.

FIG. 11A is a first pair of the differential amplifier 55 followed by a hysteresis decision amplifier 56 for the second comparator 48' of FIG. 11.

Figure 11B:
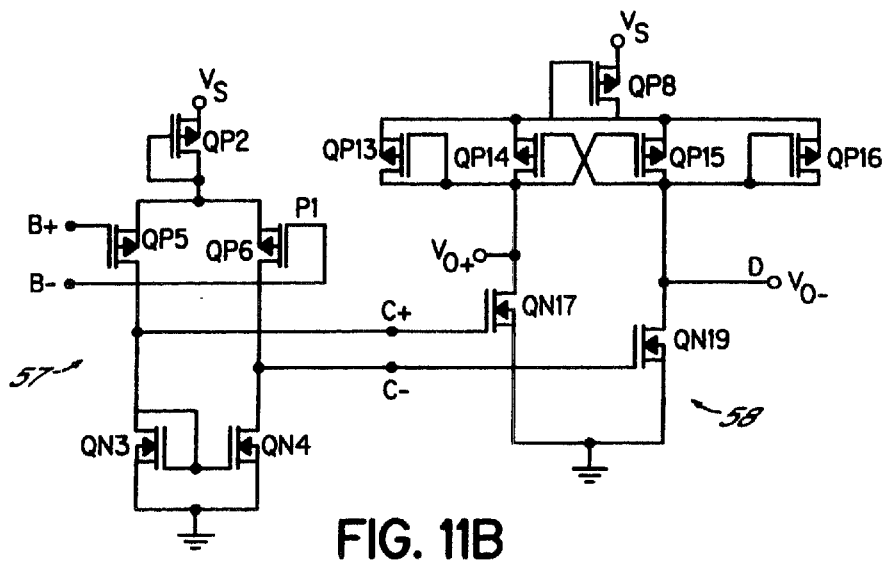
FIG. 11B is a second pair of a differential amplifier followed by a hysteresis decision amplifier for the second comparator of FIG. 11.

FIG. 11B is a second pair of the differential amplifier 57 followed by the hysteresis decision amplifier 58 for the second comparator 48' of FIG. 11.

Figure 11C:
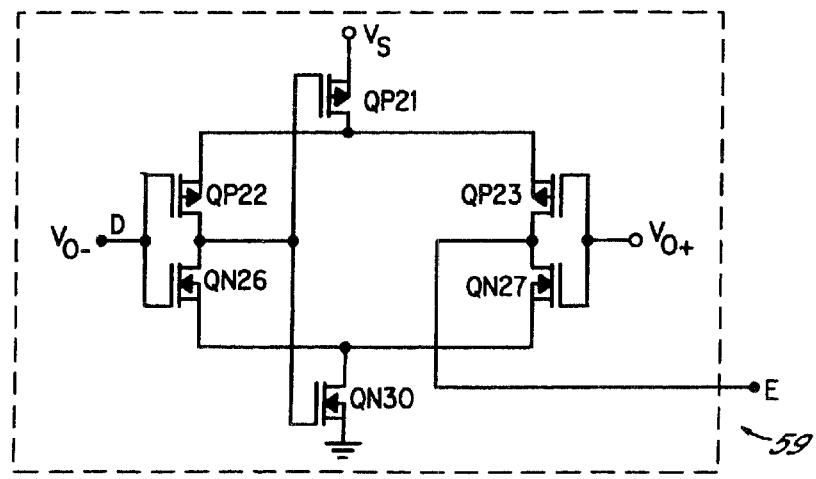
FIG. 11C is a self-biasing amplifier for the second comparator of FIG. 11.

FIG. 11C is the self-biasing amplifier 59 for the second comparator 48' of FIG. 11.

Figure 11D:
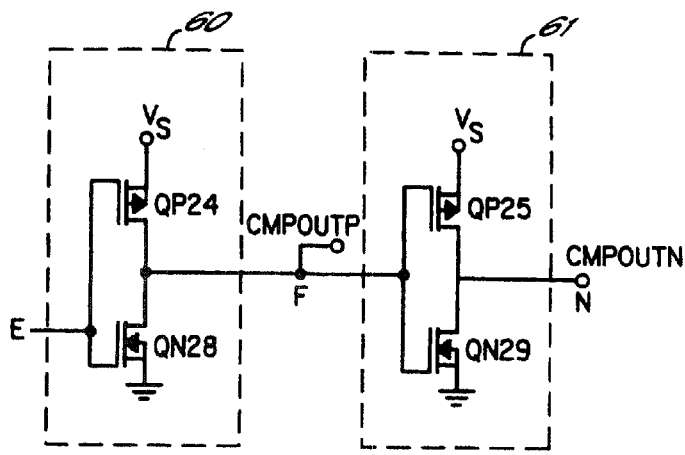
FIG. 11D is a pair of inverters for the second comparator of FIG. 11.

FIG. 11D is a pair of the inverters 60, 61 for the second comparator 48' of FIG. 11.

Figure 12A:
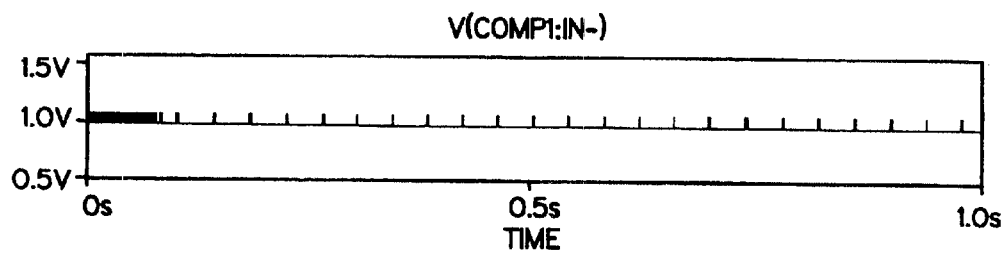
FIGS. 12A–12D are voltage plots representative of the second comparator shown in FIGS. 11, 11A–11D, specifically the FIG. 12A includes the first differential amplifier, hysteresis decision amplifier pair, FIG. 12B includes the second differential amplifier, hysteresis decision amplifier pair, FIG. 12C includes a self-biasing amplifier, and FIG. 12D contains a pair of inverters.
Figure 12B:
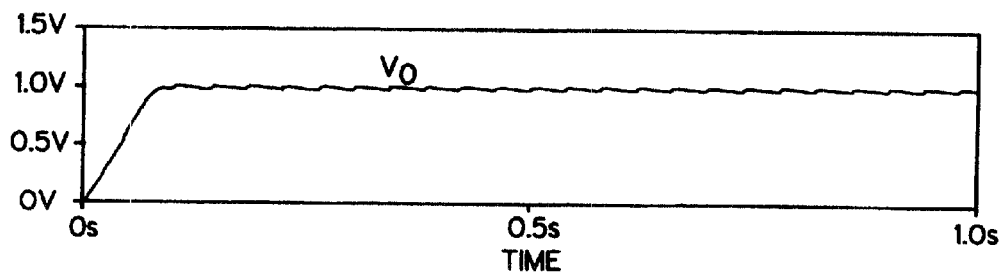
Figure 12C:
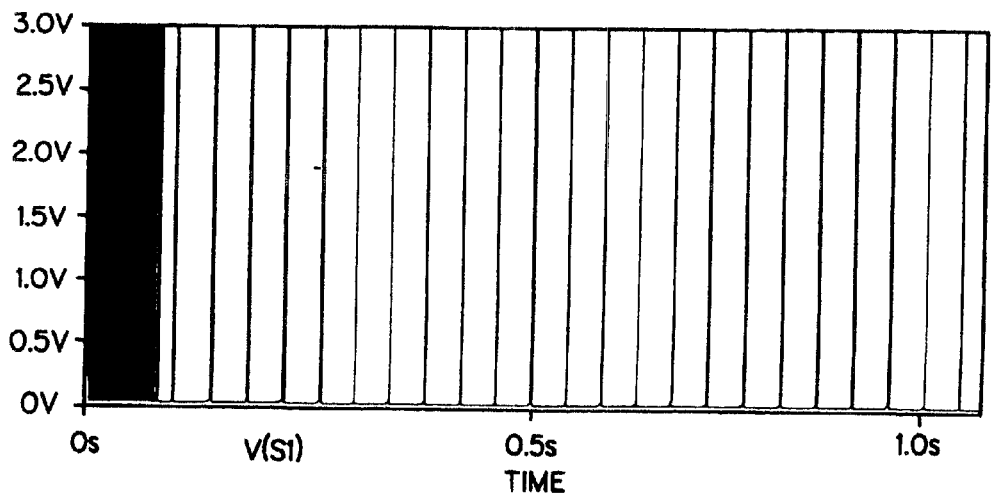
Figure 12D:
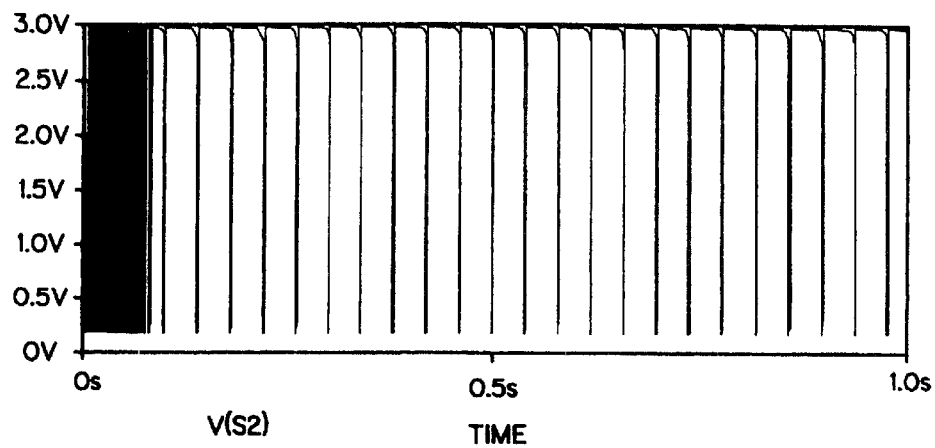

FIGS. 12A–12D show voltage plots representative of the second comparator 48' shown in FIGS. 11, 11A–D, specifically the FIG. 12A includes the first differential amplifier 64, hysteresis decision amplifier 65 pair, FIG. 12B includes the second differential amplifier 66, hysteresis decision amplifier 67 pair, FIG. 12C includes a self-biasing amplifier 68, and FIG. 12D contains a pair of inverters 69, 70.

Figure 13:
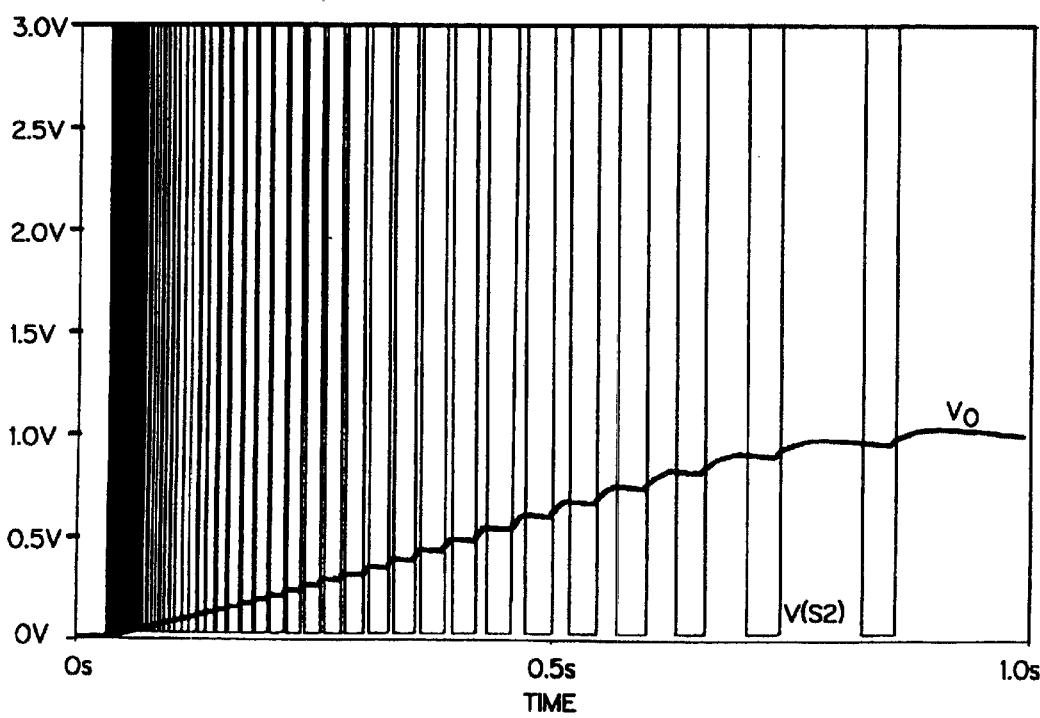
FIG. 13 is the voltage plots of FIGS. 12B and 12D for the initial charge-up period of the output capacitor.

FIG. 13 is the voltage plots of FIG. 12B and 12D for the initial charge-up period of the output capacitor $C_{OUT}$.

Figure 14:
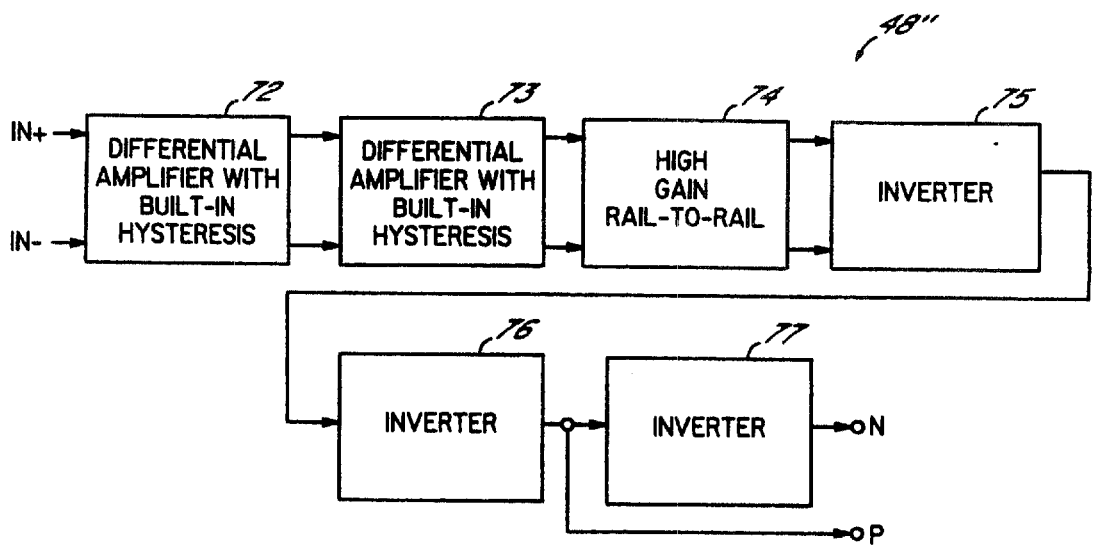
FIG. 14 is an electrical block diagram for a third comparator for the switching matrix controller of FIG. 10.

FIG. 14 is an electrical block diagram for a third comparator 48" for the switching matrix controller 46 of FIG. 10. In particular, a series arrangement is depicted of a first and second differential amplifier with built-in hysteresis 72, 73, a high gain rail-to-rail 74, and a first, second and third inverter 75, 76, 77.

Figure 14A:
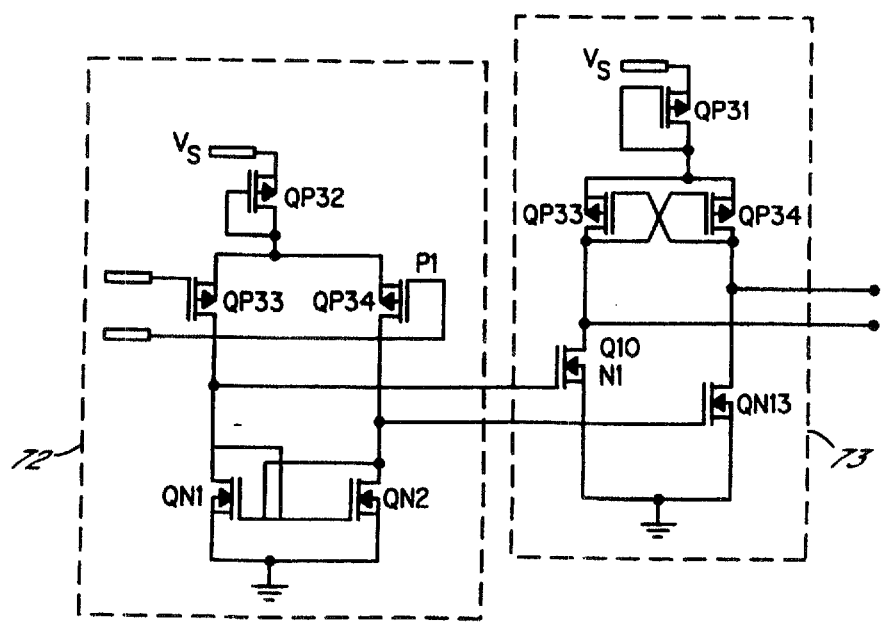
FIG. 14A is a pair of differential amplifiers with built-in hysteresis for the comparator of FIG. 14.

FIG. 14A is a pair of differential amplifiers with built-in hysteresis 72, 73 for the comparator 48" of FIG. 14.

Figure 14B:
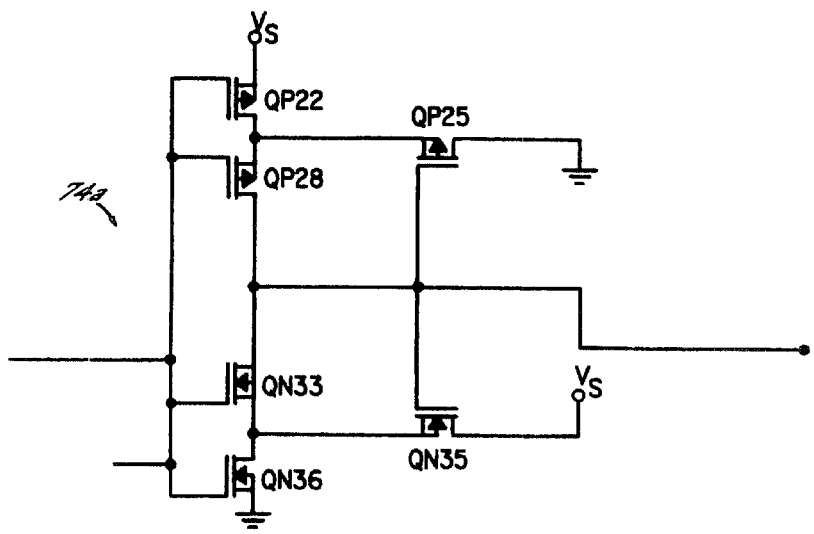
FIG. 14B is a Schmitt trigger for high gain rail-to-rail for the comparator of FIG. 12.

FIG. 14B is a Schmitt trigger 74a for high gain rail-to-rail for the comparator 48" of FIG. 14.

Figure 14C:
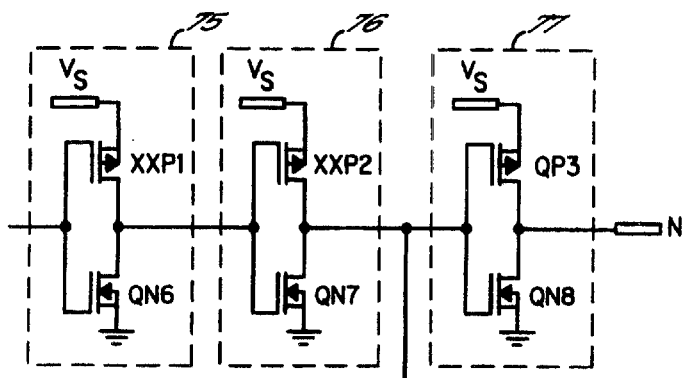
FIG. 14C are three inverters for the comparator of FIG. 14 to square off the switching points.

FIG. 14C are three inverters 75, 76, 77 for the comparator 48" of FIG. 14 to square off the switching points.

Figure 15A:
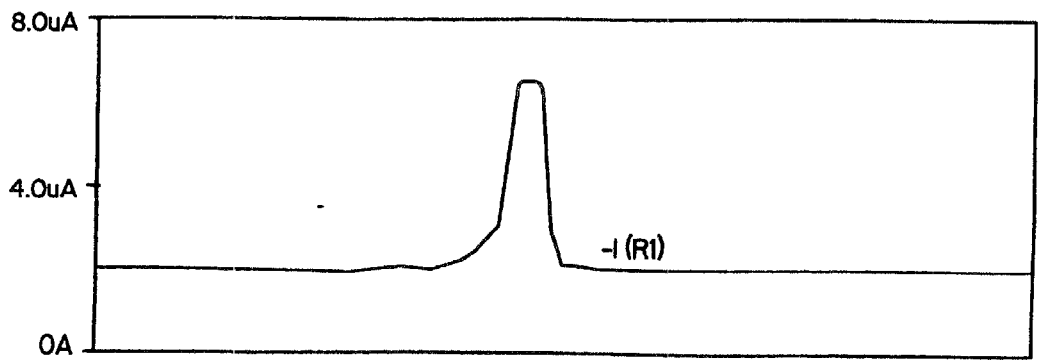
FIG. 15A is the current drawn in conjunction with the switching matrix status shown in FIG. 15B for the circuit of FIGS. 14, 14A–C.

FIG. 15A is the current drawn in conjunction with the switching matrix status shown in FIG. 15B for the comparator 48" of FIGS. 14, 14A–C.

FIG. 16 is an electrical circuit for a single-stage boost chain internal power supply 56a for the Application Specific Integrated Circuit (ASIC) 48 of FIG. 2 with FIG. 16A depicting a clocking signal to properly sequence the circuit.

Figure 17:
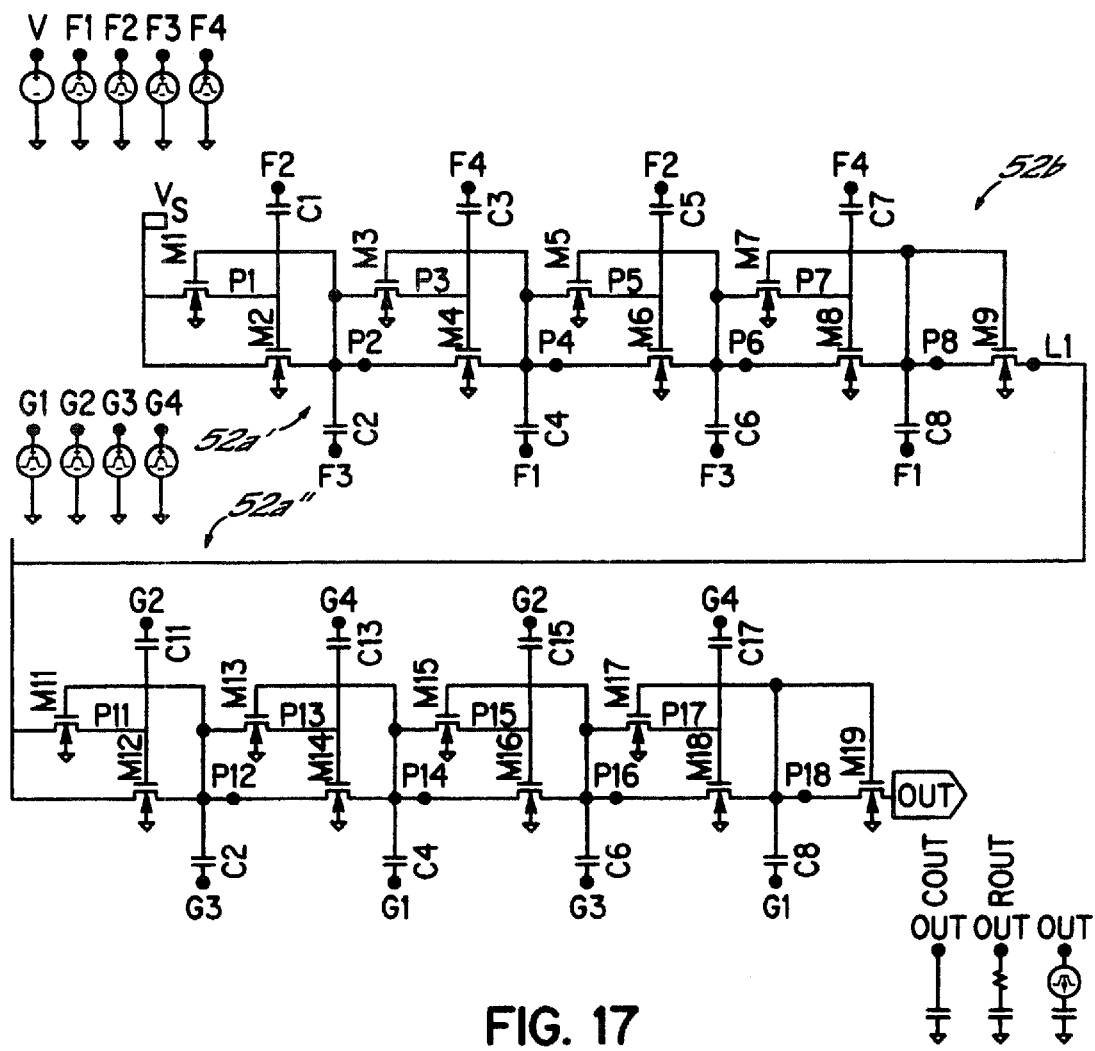
FIG. 17 is an electrical circuit for a multi-stage boost chain internal power supply for the Application Specific Integrated Circuit (ASIC) of FIG. 3 with FIG. 17A depicting a clocking signal to properly sequence the circuit.

FIG. 17 is an electrical circuit for a multi-stage boost chain internal power supply 56b for the Application Specific Integrated Circuit (ASIC) 48 of FIG. 2 with FIG. 17A depicting a clocking signal to properly sequence the circuit. The multi-stage boost chain internal power supply 56b is formed from a series combination of two single-stage boost chain internal power supply 56a', 56a".

Figure 18:
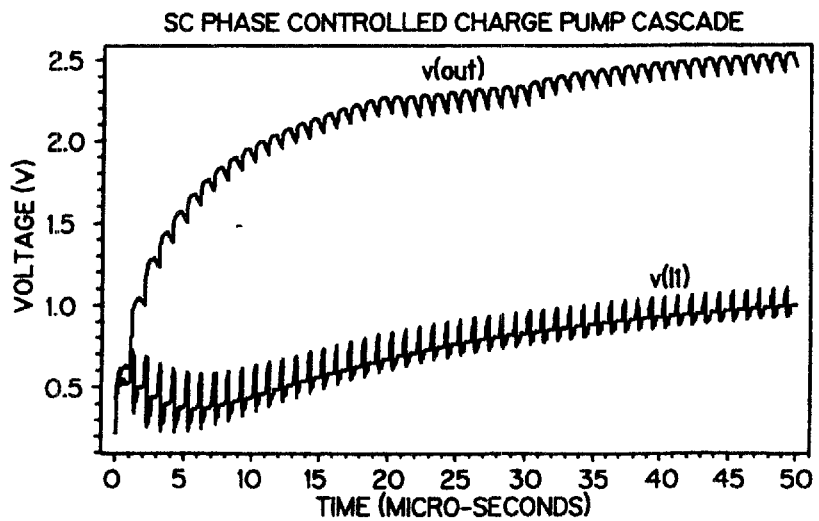
FIG. 18 is a voltage plot over time for each stage of the multi-stage boost chain internal power supply of FIG. 17.

FIG. 18 is a voltage plot over time for each stage 56a', 56a" of the multi-stage boost chain internal power supply 56b of FIG. 17.

It should be appreciated by those skilled in the art having the benefit of the instant disclosure that, although the capacitive switching matrix 44 is shown with one load capacitor $C_{OUT}$ and one fly capacitor $C_{FLY}$, more than two capacitors may be employed to achieve a desired capacitance. Moreover, although a one-stage capacitive charge pump 26 is shown, a plurality of stages may be employed to further adjust the voltage potential ($V_O$) at the terminals 38, 40 of the battery 28. Additionally, the battery 28 having a built-in dynamically-switched capacitive power converter 30 may include one or more voltaic cells 36. Furthermore, although the power converter 30 is illustrated as being advantageously incorporated into a battery 28, various versions consistent with aspects of the invention would be separate components and/or utilize other types of energy sources 12.

In addition, although a comparator 53 is shown as providing a closed-loop control function that provided advantageous dynamic switching control, those skilled in the art will recognize that other closed loop designs that perform some form of comparison may be substituted, with either tightly regulated or unregulated voltage thresholds. This allows, for example, the elimination of an oscillator open-loop control function.

Start-stop PWM Control of an Inductive-capacitive Power Converter

Figure 19A:
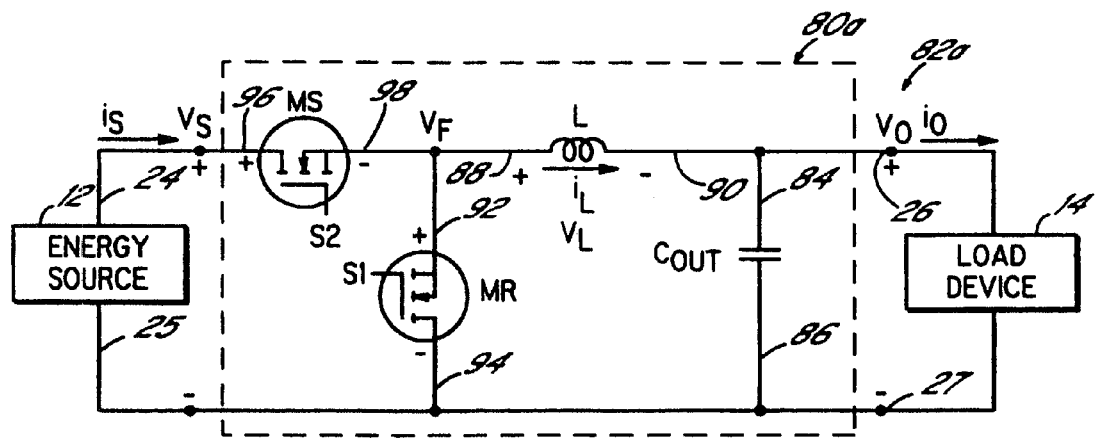
FIG. 19A is a top-level diagram of an output stage for a buck power converter.

Referring to FIG. 19A, a top-level diagram of a buck power output stage 80a for a power converter 82a is depicted, as an example of a step down power converter that provides an output voltage $V_O$ that is less than the input voltage $V_S$. The buck output stage 80a is coupled to an energy source 12 at input terminals 24, 25 and to a load device 14 at output terminals 26, 27 to deliver energy from the energy source 12 to the load device 14. The energy source 12 provides an input voltage $V_S$ and an input current $i_S$. The load device 14 receives a current $i_O$ and an output voltage $V_O$.

The buck output stage 80a includes a switch MS, a rectifying element MR, an inductive element, such as an inductor L, and a capacitance element, such as a load capacitor $C_{OUT}$. The load capacitor $C_{OUT}$ has its positive terminal 84 coupled to the positive output terminal 26 and its negative terminal 86 coupled the negative output terminal 27, which is also coupled to the negative input terminal 25 forming a ground reference. The load capacitor $C_{OUT}$, thus, is charged to the output voltage $V_O$. The inductor L has its positive end 88 coupled to a node having a feedback voltage $V_F$. The feedback voltage $V_F$ is related to a voltage $V_L$ across the inductor L. The inductor L has its negative end 90 coupled to the positive output terminal 26.

The rectifying element MR, implemented as a MOSFET configured as a synchronous rectifier, has its positive terminal (source) 92 coupled to the feedback voltage node $V_F$ and its negative terminal (drain) 94 coupled to the negative input and output terminals, 25, 27. The rectifying element MR closes in response to a control signal S1. The MOSFET of the rectifying element MR has a channel that conducts current in the reverse direction, and thereby acts like a diode by having the source and drain reversed compared to the MOSFET switch MS. The switch MS has its positive end (drain) 96 coupled to the positive input terminal 24 and its negative end (source) 98 coupled to the feedback voltage node $V_F$. The switch MS closes in response to control signal S2 turning ON.

During the discharge state, the control signal S1 is ON to close the rectifying element MR so that it conducts and the control signal S2 is OFF to open the switch MS, allowing the inductor L to discharge into the load capacitor CL. During the charge state, the control signal S1 is OFF to open the rectifying element or make it non-conductive MR and the control signal S2 is ON to close the switch MS, allowing the inductor to be energized by the input current $i_S$ from the energy source 12.

Figure 19B:
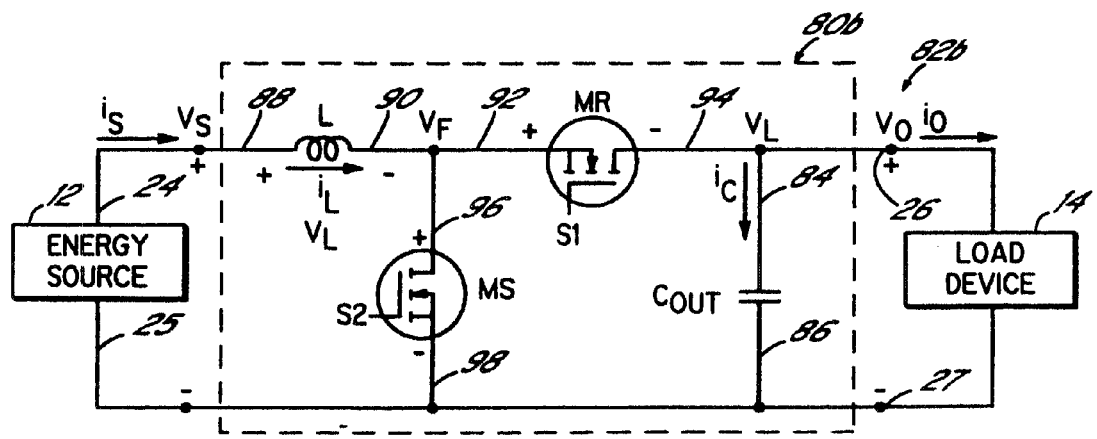
FIG. 19B is a top-level diagram of an output stage for a boost power converter.

Referring to FIG. 19B, a boost power output stage 80b for a power converter 82b illustrates a configuration suitable for increasing (boosting) the output voltage $V_O$ with respect to the input voltage $V_S$. The load capacitor $C_{OUT}$ has its positive terminal 84 coupled to the positive output terminal 26 and its negative terminal 86 coupled the negative output terminal 27, which is also coupled to the negative input terminal 25 forming a ground reference. The load capacitor $C_{OUT}$, thus, is charged to the output voltage $V_O$. The inductor L has its negative end 90 coupled to the node having a feedback voltage $V_F$ and its positive end 88 coupled to the positive input terminal 24. The inductor voltage $V_L$ is defined between the input terminal 24 and the feedback voltage node $V_F$. This inductor voltage $V_L$ is thus equivalent to the feedback voltage $V_F$ minus the input voltage $V_S$.

Rectifying element MR has its negative end 94 coupled to node $V_L$, the positive terminal 84 of the load capacitor $C_{OUT}$ and thus also to the positive output terminal 26. The rectifying element MR has its positive end 92 coupled to the feedback voltage node $V_F$. MOSFET switch MS has its positive end (drain) 96 coupled to the feedback voltage node $V_F$ and its negative end (source) 98 coupled to the negative input and output terminals 25, 27.

During the discharge state, the MOSFET switch MS opens in response to control signal S2 turning OFF and rectifying element MR closes in response to control signal S1 turning ON, coupling the energy source 12 and inductor L to the load capacitor $C_L$. Thus, the input voltage $V_L$ and inductor voltage $V_L$ are added in order to boost the output voltage $V_O$ imparted to the load capacitor $C_L$. During the charge state, MOSFET switch MS closes in response to control signal S2 turning ON, coupling the inductor L across the energy source 12. Rectifying element MR opens in response to control signal S1 turning OFF, disconnecting the load capacitor $C_{OUT}$ from the energy source 12 and inductor L.

In accordance with one aspect of the present invention, the buck power output stage 80a of FIG. 19A and the boost power output stage 80b of FIG. 19B are both advantageously efficient and operable with a low input voltage (e.g., sub-one volt) by implementation as an integrated circuit fabricated in a 0.35 micron double salicide process (two metal, two poly salicide) utilizing MOSFET transistor switches capable of low threshold (e.g., sub-one volt) control, as described the following co-pending and commonly owned applications all filed on Mar. 22, 2000: U.S. Ser. No. 09/532,761, entitled "Lateral Asymmetric Lightly Doped Drain MOSFET", naming Ying Xu et al. (P&G Case No.7992), which is hereby incorporated by reference. In addition to having a low threshold control, the disclosed MOSFET devices have a low on-resistance, directly contributing to the efficiency of the power output stage 80a and 80b used in accordance with the invention.

Figure 20:
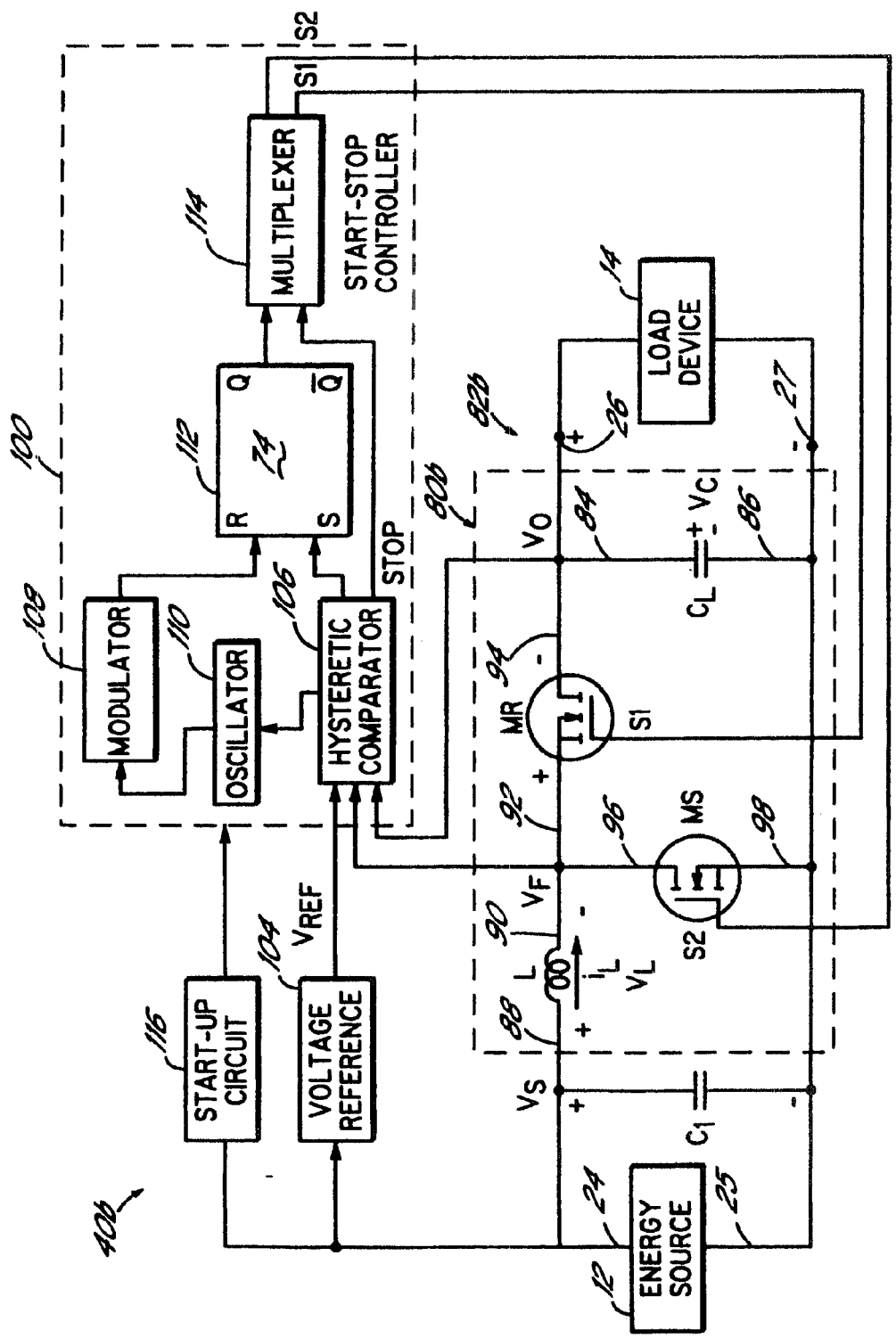
FIG. 20 is one version of a circuit for a start-stop controller for the boost power converter of FIG. 19B.

Referring to FIG. 20, a start-stop power converter 82b utilizes a start-stop controller 100 to switchably control the power output stage 80b of FIG. 19B. Generally known power converters, including inductive power converters, continue to oscillate, even when a low demand from the load device 14 makes oscillation by the power converter inefficient. Consequently, the start-stop controller 100 advantageously stops the oscillation of a Pulse Width Modulation (PWM) output when the load capacitor $C_{OUT}$ is adequately charged.

Specifically, the boost power output stage 80b is as described above in FIG. 19B, except for the addition of a capacitive element C1 coupled across input terminals 24, 25 which is used to enhance the stability of input voltage $V_S$.

The start-stop controller 100 is responsive to input signals for pulse width modulation (PWM), and oscillated control of the power output stage 80b by selectively generating the control signal S1 to close the rectifying element MR during the discharge state and to open the rectifying element MR during the charge state, and selectively generating the control signal S2 to open the switch MS during the discharge state and to close the switch MS during the charge state. The start-stop controller 100 senses a low demand as indicated by the comparison of the reference voltage $V_{REF}$ from a voltage reference 104 and the output voltage $V_O$ to hysteretically stop the oscillated control signal so that the output stage 80b remains in the discharge state. The start-stop controller 100 includes a hysteretic comparator 106 responsive to the reference voltage $V_{REF}$, the output voltage $V_O$ and the feedback voltage $V_F$ to generate a duty-cycle signal, and hysteretically responsive to the output voltage $V_O$ and the reference voltage $V_{REF}$ to generate a stop signal. A modulator 108 generates an oscillation signal having the predetermined frequency from a fixed-frequency oscillator 110. An SR flip flop 112 is set by the set duty-cycle signal and reset by the oscillation signal to produce a switching signal which determines the charge state and the discharge state. A multiplexer 114 is responsive to the switching signal to generate the control signals S1 and S2. The multiplexer 114 has a predetermined state switching delay to mitigate cross conduction of the power output stage 80b. The multiplexer 114 is also responsive to the stop signal to stop oscillations until more energy is needed by turning OFF control signal S2 to open switch MS and by turning ON control signal S1 to close rectifying element MR.

In addition, a start-up circuit 116 biases the start-stop controller 100 when the power output stage 80b is discharged, as well as providing initial charge to the load capacitor $C_L$.

Referring to FIG. 21, the operation of the start stop power converter 82a is shown in a timing diagram. The source voltage $V_S$ tends to decay over time in many applications, such as an energy source 14 comprised of electrochemical voltaic cells, eventually falling below the nominal voltage rating $V_{NOM}$ for that class of energy source 12.

The output voltage $V_O$ is initially below two voltage thresholds, $V_{OFF}$ and $V_{ON}$. The duty cycle of the switching between charge and discharge states is a predetermined value considering the capacitive and inductive values of the components and the desired output voltage $V_O$, with the duty cycle responding to the decline in the source voltage $V_S$ to maintain the output voltage $V_O$. The operation of switching duty cycle continues until a time A when the output voltage $V_O$ is greater than the voltage threshold $V_{OFF}$, whereupon the hysteretic comparator 70 signals the multiplexer 114 to stop outputting the switching signals S1 and S2, opening the rectifying element MR and switch MS. The load device 14 draws stored energy from the output capacitor $C_{OUT}$, drawing down the output voltage $V_O$ until it drops below the voltage threshold $V_{OFF}$. However, the comparator 70 hysteretically responds by waiting until time B, when the output voltage $V_O$ drops below the voltage threshold $V_{ON}$, before signaling the multiplexer 114 to recommence switching signals S1 and S2.

The invention in its broader aspects is therefore not limited to the specific details. representative apparatus and methods, and illustrative examples shown and described. Accordingly, departure may be made from such details without departing from the spirit or scope of applicants' general inventive concept.

What is claimed is:

1. A battery comprising:
    a voltaic cell including a positive electrode and a negative electrode, the cell storing electrical charge resulting in an electrode voltage across the positive and negative electrodes;
    a container substantially encompassing the voltaic cell, the container including a positive terminal and a negative terminal; and characterized in that
    a dynamically-switched capacitive charge pump electrically interposed between the electrodes and the terminals, the charge pump substantially encompassed by the container, preferably wherein the dynamically-switched capacitive charge pump includes an integrated circuit.

2. The battery of claim 1 wherein the capacitive charge pump includes an output capacitor electrically coupled across the positive and negative terminals and wherein the capacitive charge pump includes a fly capacitor alternately electrically coupled across the electrodes to charge in a charge mode and in additive series combination with the voltaic cell to discharge into the output capacitor in a discharge mode, preferably wherein one of the fly capacitor and the output capacitor is a high efficiency capacitor.

3. The battery of any of the preceding claims wherein the charge pump further includes:
    a switching matrix electrically switchably coupling the fly capacitor, the output capacitor, and the voltaic cell between the charge mode and the discharge mode; and
    a switching matrix controller operatively coupled to the switching matrix to command the switching between charge and discharge modes, preferably wherein the switching matrix controller includes a comparator responsive to the output voltage falling below a predetermined threshold to command the switching matrix to the discharge mode and responsive to the output voltage rising above the predetermined threshold to command the switching matrix to the charge mode, even more preferably wherein the comparator includes a hysteresis circuit to prevent rapid oscillation when the output voltage approaches the predetermined threshold and/or the comparator includes an output stage including an amplifier and hysteresis device.

4. The battery of any of the preceding claims further including one or more of the following:
    (a) an internal power supply electrically coupled to the voltaic cell as a voltage source, the internal power supply electrically biasing the switching matrix controller; and
    (b) a voltage reference circuit providing a voltage reference to the switching matrix controller, preferably including a temperature compensation circuit for the voltage reference circuit.

5. The battery of any of the preceding claims wherein the switching matrix comprises a first switch electrically switchably coupling the positive electrode to a first end of the fly capacitor, a second switch electrically switchably coupling the first end of the fly capacitor to the positive terminal of the battery, a third switch electrically switchably coupling the negative electrode to a second end of the fly capacitor, and a fourth switch electrically switchably coupling the second end of the fly capacitor to the positive electrode, preferably wherein the first switch, second switch, third switch, and fourth switch are comprised respectively of integrated circuit field effect, and wherein the first and third switches are closed with the second and fourth switches open to affect the charge mode and inversely for the discharge mode, even more preferably wherein the switching matrix further includes an initial condition wherein a portion of the power converter is deactivated.

6. The battery of any of the preceding claims wherein the voltaic cell comprises a selected one of a lithium electrochemical cell and an alkaline electrochemical cell.

7. A power management circuit configured to adjust an output voltage across positive and negative terminals of a battery, the battery further including a voltaic cell having a positive electrode and a negative electrode, a fly capacitor, and a load capacitor electrically coupled across the terminals, the power management circuit comprising:
    a switching matrix being electrically switchable between a charge mode and a discharge mode, wherein the switching matrix in charge mode comprises being configured to electrically couple the fly capacitor across the electrodes of the voltaic cell, and wherein the switching matrix in discharge mode comprises being configured to electrically couple across the load capacitor the series combination of the voltaic cell and the fly capacitor; and
    a switching matrix controller operatively coupled to the switching matrix to select the charge and discharge modes.

8. The power management circuit of claim 7 wherein the switching matrix comprises one of the following: a noninverting switched capacitive device, an inverting switched capacitive device and an inductive power converter.

9. A power converter with input terminals for coupling to an energy source and output terminals for coupling to a load device, the power converter comprising:
    an output stage for selectively coupling the input terminals to the output terminals to deliver energy from an energy source to a load device;

a start-stop controller operably coupled to the output stage for pulse width modulation controlling said selective coupling of the input and output terminals;

the output stage comprising an inductive element coupled to the input terminals, a capacitive element coupled to the output terminals, a rectifying element closingly responsive to a first state and openly responsive to a second state, and a switch responsive to a control signal S2 from the controller, the rectifying element and the switch being operably coupled with respect to said inductive and capacitive elements for causing the inductive element to be coupled to the capacitive element to discharge energy therefrom into the capacitive element during the first state and causing the inductive element to be energized during the second state;

the start-stop controller being hysteretically responsive to input signals from the output stage indicating a charged capacitive element for discontinuing coupling of the input and output terminals.

* * * * *